(12) United States Patent
Mendoza

(10) Patent No.: US 9,531,307 B2
(45) Date of Patent: Dec. 27, 2016

(54) MOTOR CONTROL METHOD AND MOTOR CONTROL APPARATUS

(71) Applicant: Nidec Corporation, Kyoto (JP)

(72) Inventor: Rafael Herrejon Mendoza, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 79 days.

(21) Appl. No.: 14/667,889

(22) Filed: Mar. 25, 2015

(65) Prior Publication Data

US 2015/0288305 A1 Oct. 8, 2015

(30) Foreign Application Priority Data

Apr. 3, 2014 (JP) ................................. 2014-076649

(51) Int. Cl.
  *H02P 21/00* (2016.01)
  *H02P 6/14* (2016.01)
  *H02P 27/08* (2006.01)

(52) U.S. Cl.
  CPC ............. *H02P 6/14* (2013.01); *H02P 21/0085* (2013.01); *H02P 27/085* (2013.01)

(58) Field of Classification Search
  CPC ............................. H02P 6/14; H02P 21/0085
  USPC .................................................... 318/400.02
  See application file for complete search history.

(56) References Cited

U.S. PATENT DOCUMENTS

| 6,751,105 B2 * | 6/2004 | Yamanaka ............ H02M 7/483 318/801 |
| --- | --- | --- |
| 7,598,698 B2 | 10/2009 | Hashimoto et al. |
| 8,281,886 B2 | 10/2012 | Saha et al. |
| 2004/0207360 A1 * | 10/2004 | Matsushiro ........ B60H 1/00428 318/811 |
| 2011/0062903 A1 | 3/2011 | Li et al. |
| 2013/0330207 A1 * | 12/2013 | Nakajima ............... F04B 17/03 417/44.1 |

(Continued)

FOREIGN PATENT DOCUMENTS

| JP | 10-248262 A | 9/1998 |
| --- | --- | --- |
| JP | 3051844 B2 | 6/2000 |

(Continued)

OTHER PUBLICATIONS

Lai, Y. et al., "A New Suboptimal Pulse-Width Modulation Technique for Per-Phase Modulation and Space Vector Modulation", IEEE Transactions on Energy Conversion, vol. 12, No. 4, Dec. 1, 1997, pp. 310-316.

*Primary Examiner* — Erick Glass
(74) *Attorney, Agent, or Firm* — Keating & Bennett, LLP

(57) ABSTRACT

A method of controlling a motor includes a) acquiring a rotational speed parameter; b) selecting either a three-phase modulation scheme and a two-phase modulation scheme based on a result of comparing a rotational speed of the motor with a predetermined reference speed; c) calculating phase voltage command values based on a target rotational speed and the rotational speed parameter; d) generating switching signals by using the selected modulation scheme based on the phase voltage command values; and e) outputting the switching signals to an inverter. In step b), the two-phase modulation scheme is selected when the rotational speed of the motor is higher than the reference speed to reduce switching loss is reduced and improve power efficiency without deteriorating starting characteristics and motor drive characteristics when the rotational speed is low.

11 Claims, 12 Drawing Sheets

(56) References Cited

U.S. PATENT DOCUMENTS

2014/0176027 A1\* 6/2014 Osaki .................. H02P 6/002
　　　　　　　　　　　　　　　　　　318/400.2

FOREIGN PATENT DOCUMENTS

| JP | 2012-090429 A | 5/2012 |
| JP | 2013-225979 A | 10/2013 |

\* cited by examiner (FIRST PREFERRED EMBODIMENT: FUNCTIONAL BLOCK DIAGRAM)

(FIRST PREFERRED EMBODIMENT: INVERTER)

(FIRST PREFERRED EMBODIMENT: FLOWCHART)

(FIRST PREFERRED EMBODIMENT: PHASE VOLTAGE COMMAND VALUES

IN THREE-PHASE MODULATION)

(a) FIRST PHASE VOLTAGE COMMAND VALUES S49

(b) CORRECTION SIGNAL ΔV (c) SECOND PHASE VOLTAGE COMMAND VALUES S51

(FIRST PREFERRED EMBODIMENT: SWITCHING SIGNALS IN THREE-PHASE MODULATION)

(a) CARRIER SIGNAL S53 SECOND PHASE VOLTAGE COMMAND VALUES S51

(b) SWITCHING SIGNALS S4

(FIRST PREFERRED EMBODIMENT: PHASE VOLTAGE COMMAND VALUES IN TWO-PHASE MODULATION)

(a) FIRST PHASE VOLTAGE COMMAND VALUES S49

(b) CORRECTION SIGNAL ΔV (c) SECOND PHASE VOLTAGE COMMAND VALUES S51

(FIRST PREFERRED EMBODIMENT: SWITCHING SIGNALS IN TWO-PHASE MODULATION)

(a) CARRIER SIGNAL S53 AND SECOND PHASE VOLTAGE COMMAND VALUES S51

(b) SWITCHING SIGNALS S4

(FIRST PREFERRED EMBODIMENT: CURRENT CORRECTION)

(a) CARRIER SIGNAL S53 AND SECOND PHASE VOLTAGE COMMAND VALUES S51

(b) SWITCHING SIGNALS BEFORE CORRECTION (c) SWITCHING SIGNALS S4

(MODIFICATION: ELIMINATION OF 0TH FUNDAMENTAL SPACE VECTOR)

(a) FIRST PHASE VOLTAGE COMMAND VALUES S49

(b) CORRECTION SIGNAL ΔV (c) SECOND PHASE VOLTAGE COMMAND VALUES S51

(MODIFICATION: SWITCHING SIGNALS WHEN 0TH FUNDAMENTAL SPACE VECTOR IS ELIMINATED)

(a) CARRIER SIGNAL S53 AND SECOND PHASE VOLTAGE COMMAND VALUES S51

(b) SWITCHING SIGNALS S4

(MODIFICATION: MOTOR INCLUDING SENSOR / FUNCTIONAL BLOCK DIAGRAM)

(MODIFICATION: MOTOR INCLUDING SENSOR / FLOWCHART)

MOTOR CONTROL METHOD AND MOTOR CONTROL APPARATUS

BACKGROUND OF THE INVENTION

1. Field of the Invention

The present invention relates to a motor control method and a motor control apparatus.

2. Description of the Related Art

A motor control apparatus arranged to drive a brushless DC motor typically performs PWM control to supply electric drive currents to the motor. In the PWM control, a plurality of switching elements included in an inverter are turned on and off.

A known motor control apparatus is described, for example, in JP-A 10-248262. In the motor control apparatus described in JP-A 10-248262, three-phase electric drive currents are supplied to a motor by performing PWM control in which three pairs of switching elements included in a three-phase voltage source inverter are turned on and off.

Two types of modulation schemes, a three-phase modulation scheme and a two-phase modulation scheme, are known as modulation schemes used in inverters of such motor control apparatuses. In the three-phase modulation scheme, three pairs of switching elements, each pair being provided for a separate one of three phases of the motor, are turned on and off. Meanwhile, in the two-phase modulation scheme, during every predetermined cycle, one pair of the three pairs of switching elements are fixed in an ON state or an OFF state while the other two pairs of switching elements are turned on and off.

In the case of the two-phase modulation scheme, the number of switchings to be performed is smaller than in the case of the three-phase modulation scheme, and therefore, a power loss due to the switching and an increase in the temperature of the switching elements can be reduced. However, in the case of the two-phase modulation scheme, if the electric drive currents supplied to the motor are small, an effect of a disturbance or the like may become so significant that the waveforms of the electric drive currents may be easily disturbed and an overvoltage and undesirable harmonics may occur.

SUMMARY OF THE INVENTION

Preferred embodiments of the present invention have been conceived to provide a motor control method and a motor control apparatus which are able to improve power efficiency without deteriorating either starting characteristics or drive characteristics when a rotational speed is low.

According to a preferred embodiment of the present invention, a method of controlling a motor driven by a three-phase voltage source inverter include the steps of: a) acquiring a rotational speed parameter representing a rotational speed of the motor; b) after step a), selecting one of a first system and a second system as a switching signal generation system based on a result of comparing the rotational speed of the motor represented by the rotational speed parameter with a predetermined reference speed; c) after step a), calculating phase voltage command values for each of three phases of the motor based on a target rotational speed and the rotational speed parameter; d) after steps b) and c), generating switching signals for each of the three phases of the motor by using the selected switching signal generation system based on the phase voltage command values; and e) after step d), outputting the switching signals to the inverter. The first system is a three-phase modulation scheme which calculates duties of the switching signals for each of the three phases of the motor based on voltage values of the phase voltage command values for each of the three phases of the motor and a voltage value of a carrier signal. The second system is a two-phase modulation scheme which, based on the voltage values of the phase voltage command values for each of the three phases and the voltage value of the carrier signal, selects one of the three phases and fixes the duties of the switching signals for the selected phase in an ON state or an OFF state, and calculates the duties of the switching signals for the other two phases. In step b), the second system is selected when the rotational speed is higher than the reference speed.

According to another preferred embodiment of the present invention, a motor controller configured or programmed to supply electric drive currents to a motor includes a rotational speed detector configured or programmed to acquire a rotational speed parameter representing a rotational speed of the motor; a switching signal generation system determination controller configured or programmed to determine a switching signal generation system; a phase voltage command value calculator configured or programmed to calculate phase voltage command values for each of three phases of the motor based on a target rotational speed and the rotational speed parameter; a switching signal generator configured or programmed to generate switching signals for each of the three phases of the motor in accordance with the switching signal generation system; and an inverter configured to output the electric drive currents to the motor based on the switching signals. The switching signal generation system determination controller is configured or programmed to select one of a first system and a second system as the switching signal generation system based on a result of comparing the rotational speed of the motor represented by the rotational speed parameter with a predetermined reference speed. The first system is a three-phase modulation scheme which calculates duties of the switching signals for each of the three phases of the motor based on voltage values of the phase voltage command values for each of the three phases of the motor and a voltage value of a carrier signal. The second system is a two-phase modulation scheme which, based on the voltage values of the phase voltage command values for each of the three phases and the voltage value of the carrier signal, selects one of the three phases and fixes the duties of the switching signals for the selected phase in an ON state or an OFF state, and calculates the duties of the switching signals for the other two phases. The switching signal generation system determination controller is configured or programmed to select the second system when the rotational speed is higher than the reference speed.

According to the above two preferred embodiments of the present invention, the three-phase modulation scheme is preferably used when the rotational speed is lower than the reference speed. Meanwhile, the two-phase modulation scheme is preferably used when the rotational speed is higher than the reference speed, when an effect of a disturbance is not significant. Thus, power efficiency is improved without deteriorating starting characteristics and drive characteristics when the rotational speed is low.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Hereinafter, preferred embodiments of the present invention will be described with reference to the accompanying drawings.

First Preferred Embodiment

Figure 1:
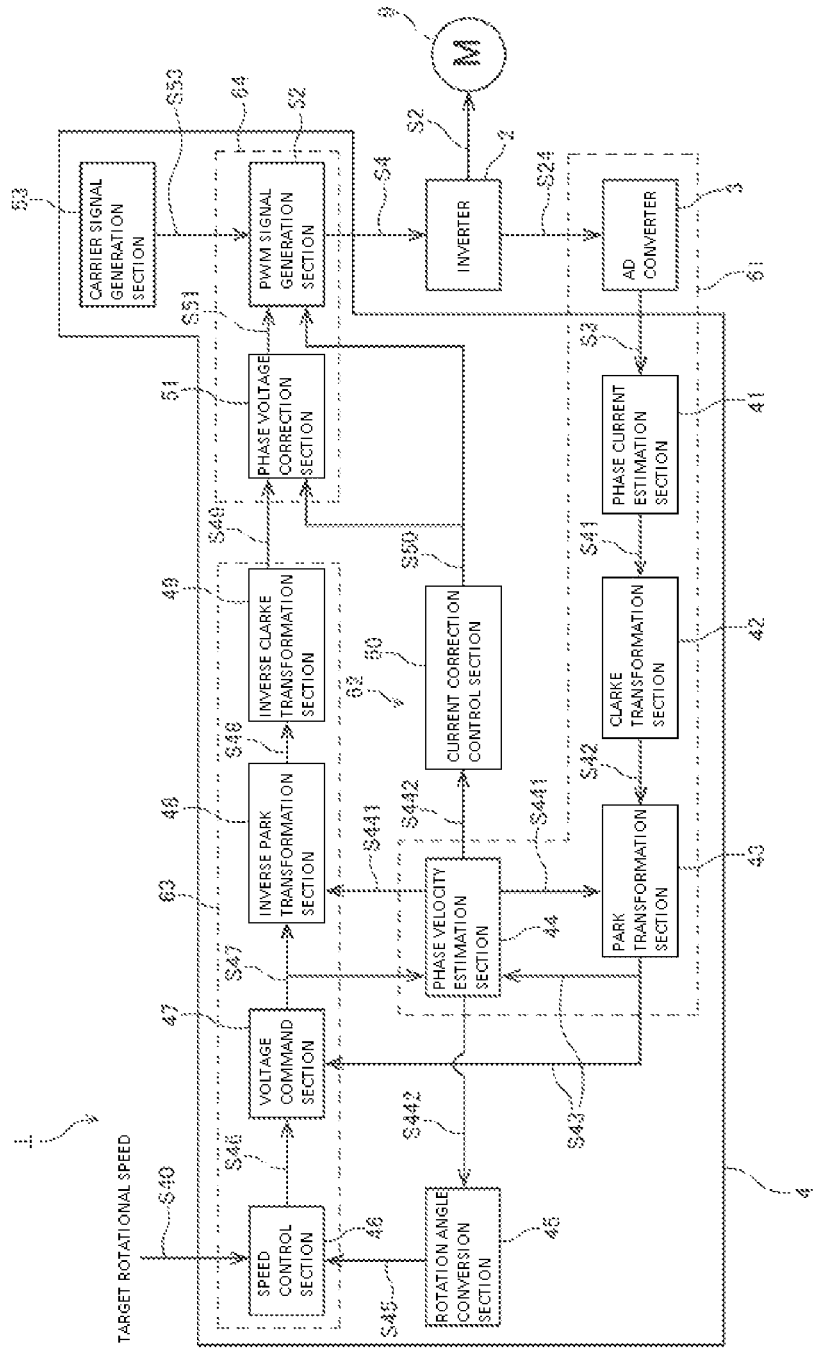
FIG. 1 is a block diagram illustrating the structure of a motor controller according to a first preferred embodiment of the present invention.
Figure 2:
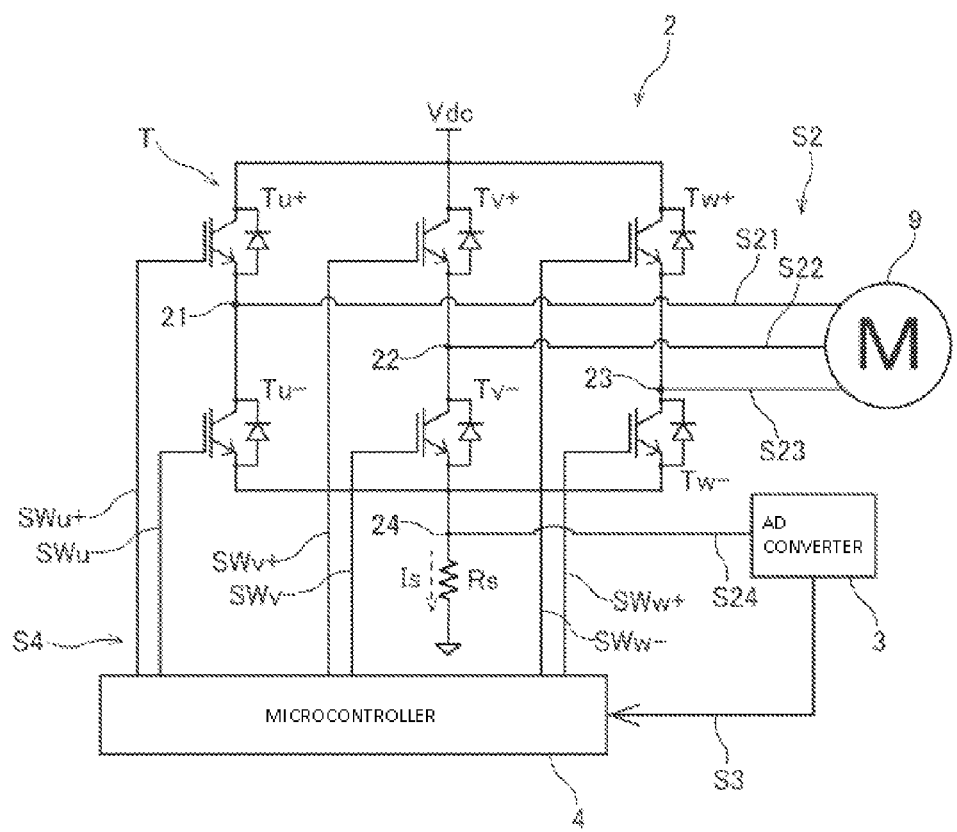
FIG. 2 is a circuit diagram illustrating the structure of an inverter according to the first preferred embodiment of the present invention.

First, the structure of a motor controller 1 according to a first preferred embodiment of the present invention will be described below with reference to FIGS. 1 and 2. FIG. 1 is a block diagram illustrating the structure of the motor controller 1. FIG. 2 is a schematic circuit diagram illustrating the structure of an inverter 2 of the motor controller 1 according to the present preferred embodiment.

The motor controller 1 is preferably, for example, a microcontroller, circuit, computer, etc. configured or programmed to control a driving of a motor 9 by supplying electric drive currents to the motor 9. As illustrated in FIG. 1, the motor controller 1 preferably includes an inverter 2, an Analog-to-Digital ("AD") converter 3, and a microcontroller 4.

The inverter 2 is configured to supply electric drive currents S2 to the motor 9 in accordance with switching signals S4. As illustrated in FIG. 2, the inverter 2 preferably includes a voltage source Vdc, six switching elements T, a shunt resistor Rs, and three motor connection terminals 21, 22, and 23, for example. This inverter 2 is a so-called three-phase voltage source inverter.

The six switching elements T include three pairs of switching elements, i.e., switching elements Tu+ and Tu− for a U phase, switching elements Tv+ and Tv− for a V phase, and switching elements Tw+ and Tw− for a W phase. Each of the switching elements T is preferably defined by a transistor and a diode. According to the present preferred embodiment, insulated-gate bipolar transistors (IGBTs), for example, are preferably used for each switching element T. Note that a switching element of another type, such as, for example, a MOSFET (a field-effect transistor), may alternatively be used in each switching element T.

The switching elements Tu+ and Tu− are connected in series between the voltage source Vdc and a ground. The switching elements Tv+ and Tv− are also connected in series between the voltage source Vdc and the ground. In addition, the switching elements Tw+ and Tw− are also connected in series between the voltage source Vdc and the ground. The switching elements Tu+ and Tu−, the switching elements Tv+ and Tv−, and the switching elements Tw+ and Tw− are connected in parallel with one another.

Of the three pairs of switching elements T, the switching elements Tu+, Tv+, and Tw+, which are closer to the voltage source Vdc, will be hereinafter referred to as upper switching elements. Meanwhile, of the three pairs of switching elements T, the switching elements Tu−, Tv−, and Tw−, which are closer to the ground, will be hereinafter referred to as lower switching elements.

The shunt resistor Rs, which is common to all the three phases U, V, and W, is connected between the ground and a ground-side contact of each of the switching elements Tu+ and Tu−, the switching elements Tv+ and Tv−, and the switching elements Tw+ and Tw−. That is, the shunt resistor Rs is connected in series with a ground line common to all the three phases of the inverter 2.

The motor connection terminals 21, 22, and 23 are preferably connected between the upper switching element Tu+ and the lower switching element Tu−, between the upper switching element Tv+ and the lower switching element Tv−, and between the upper switching element Tw+ and the lower switching element Tw−, respectively.

While the motor 9 is running, the switching signals S4, which are preferably outputted from a PWM signal generator 52 of the microcontroller 4, are inputted to the six switching elements T. The PWM signal generator 52 will be described below. More specifically, with respect to each of the U, V, and W phases, a pair of switching signals SWu+ and SWu−, a pair of switching signals SWv+ and SWv−, and a pair of switching signals SWw+ and SWw− are supplied from the microcontroller 4 to the pair of switching elements Tu+ and Tu−, the pair of switching elements Tv+ and Tv−, and the pair of switching elements Tw+ and Tw−, respectively. Thus, the switching elements Tu+, Tu−, Tv+, Tv−, Tw+, and Tw− are turned on and off appropriately to allow electric drive currents S21, S22, and S23 to be appropriately outputted from the motor connection terminals 21, 22, and 23, respectively, to the U, V, and W phases of the motor 9, respectively.

For the sake of convenience in description, the switching signals SWu+, SWu−, SWv+, SWv−, SWw+, and SWw− will be referred to collectively as the switching signals S4, and the electric drive currents S21 to S23 will be referred to collectively as the electric drive currents S2. Of the switching signals S4, switching signals inputted to the upper switching elements Tu+, Tv+, and Tw+ are referred to as upper switching signals SWu+, SWv+, and SWw+, respectively. Meanwhile, of the switching signals S4, switching signals inputted to the lower switching elements Tu−, Tv−, and Tw− will be referred to as lower switching signals SWu−, SWv−, and SWw−, respectively.

According to the above-described structure, the sum of phase currents of the U, V, and W phases of the motor 9 is inputted to the shunt resistor Rs. Thus, a shunt current Is flows through the shunt resistor Rs. A shunt current detecting terminal 24 is provided at an end portion of the shunt resistor Rs on a side away from the ground. The shunt current detecting terminal 24 is connected to the AD converter 3. While the motor 9 is running, a shunt voltage S24 applied to the shunt resistor Rs is outputted from the shunt current detecting terminal 24 to the AD converter 3.

The AD converter 3 subjects the shunt voltage S24 outputted from the shunt current detecting terminal 24 to analog-to-digital conversion to obtain a digital shunt voltage S3, and outputs the digital shunt voltage S3 to the microcontroller 4.

The microcontroller 4 is configured or programmed to output the switching signals S4 to the inverter 2 based on a target rotational speed S40 inputted from an external source and the digital shunt voltage S3. As illustrated in FIG. 1, the microcontroller 4 preferably includes a phase current estimator 41, a Clarke transformer 42, a Park transformer 43, a phase velocity estimator 44, a rotation angle converter 45, a speed controller 46, a voltage command controller 47, an inverse Park transformer 48, an inverse Clarke transformer 49, a current correction controller 50, a phase voltage correction controller 51, the PWM signal generator 52, and a carrier signal generator 53. Functions of the above portions are preferably implemented by a CPU inside the microcontroller 4 operating in accordance with a program. However, in other preferred embodiments of the present invention, it is possible to implement one or all of the elements 41-53 using discrete hardware or a combination of discrete hardware and software.

The phase current estimator 41 calculates estimated three-phase currents S41 based on the digital shunt voltage S3 inputted from the AD converter 3, and outputs the estimated three-phase currents S41 to the Clarke transformer 42. The estimated three-phase currents S41 include an estimated U-phase current Iu, which is an estimated U-phase current in the motor 9, an estimated V-phase current Iv, which is an estimated V-phase current in the motor 9, and an estimated W-phase current Iw, which is an estimated W-phase current in the motor 9.

The Clarke transformer 42 subjects the estimated three-phase currents S41 to Clarke transformation, thus transforming the estimated three-phase currents S41 to an $\alpha\beta$ stationary reference frame, to calculate stationary reference frame currents S42, and outputs the stationary reference frame currents S42 to the Park transformer 43. The stationary reference frame currents S42 include an $\alpha$-axis current I$\alpha$ and a $\beta$-axis current I$\beta$.

The Park transformer 43 subjects the stationary reference frame currents S42 to Park transformation, thus transforming the stationary reference frame currents S42 to a dq synchronously rotating reference frame, to calculate rotating reference frame currents S43 using a rotor position S441 described below, and outputs the rotating reference frame currents S43 to the voltage command controller 47 and the phase velocity estimator 44. The rotating reference frame currents S43 include a d-axis current Id and a q-axis current Iq.

The phase velocity estimator 44 calculates the rotor position S441 and a rotor speed S442 based on the rotating reference frame currents S43 and rotating reference frame voltage command values S47 described below. The rotor position S441 includes an electrical angle $\theta$ of a rotor of the motor 9. Meanwhile, the rotor speed S442 includes an electrical angular velocity $\omega$ of the rotor of the motor 9. The phase velocity estimator 44 outputs the calculated rotor position S441 to the Park transformer 43 and the inverse Park transformer 48. In addition, the phase velocity estimator 44 outputs the calculated rotor speed S442 to the rotation angle converter 45 and the current correction controller 50.

Note that, although the phase velocity estimator 44 according to the present preferred embodiment is configured to calculate the electrical angle $\theta$ and the electrical angular velocity $\omega$ of the rotor based on the rotating reference frame currents S43 outputted from the Park transformer 43 and the rotating reference frame voltage command values S47 outputted from the voltage command controller 47, this is not essential to the present invention. The phase velocity estimator 44 may alternatively be arranged to calculate the electrical angle $\theta$ and the electrical angular velocity $\omega$ of the rotor based on the stationary reference frame currents S42 outputted from the Clarke transformer 42 and stationary reference frame voltage command values S48 outputted from the inverse Park transformer 48.

The rotation angle converter 45 calculates a rotational speed S45 based on the rotor speed S442, and outputs the rotational speed S45 to the speed controller 46. The rotational speed S45 includes a mechanical angular velocity $\omega r$ of the rotor of the motor 9. The rotation angle converter 45 calculates the mechanical angular velocity $\omega r$ by dividing the electrical angular velocity $\omega$ of the rotor included in the rotor speed S442 by the number Np of pole pairs of a rotor core of the rotor.

The speed controller 46 calculates current command values S46, which are target current values in the dq synchronously rotating reference frame, based on the target rotational speed S40 inputted from the external source and the rotational speed S45, and outputs the current command values S46 to the voltage command controller 47. The current command values S46 include a d-axis current command value Idref and a q-axis current command value Iqref.

The voltage command controller 47 calculates the rotating reference frame voltage command values S47 based on the current command values S46 and the rotating reference frame currents S43. That is, the rotating reference frame voltage command values S47 are calculated based on the target rotational speed S40 and the rotating reference frame currents S43. Then, the voltage command controller 47 outputs the rotating reference frame voltage command values S47 to the phase velocity estimator 44 and the inverse Park transformer 48.

The rotating reference frame voltage command values S47 include a d-axis voltage command value Vd and a q-axis voltage command value Vq, each of which is a voltage command value in the dq synchronously rotating reference frame. The voltage command controller 47 calculates the d-axis voltage command value Vd by performing PI control based on the d-axis current Id included in the rotating reference frame currents S43 and the d-axis current command value Idref included in the current command values S46. In addition, the voltage command controller 47 calculates the q-axis voltage command value Vq by performing PI control based on the q-axis current Iq included in the rotating reference frame currents S43 and the q-axis current command value Iqref included in the current command values S46.

The inverse Park transformer 48 subjects the rotating reference frame voltage command values S47 to inverse Park transformation using the rotor position S441, thus transforming the rotating reference frame voltage command values S47 to the αβ stationary reference frame, to calculate the stationary reference frame voltage command values S48, and outputs the stationary reference frame voltage command values S48 to the inverse Clarke transformer 49. The stationary reference frame voltage command values S48 include an α-axis voltage command value Vα and a β-axis voltage command value Vβ, each of which is a voltage command value in the αβ stationary reference frame.

The inverse Clarke transformer 49 subjects the stationary reference frame voltage command values S48 to inverse Clarke transformation, thus transforming the stationary reference frame voltage command values S48 to a three-phase reference frame, to calculate first phase voltage command values S49, and outputs the first phase voltage command values S49 to the phase voltage correction controller 51. The first phase voltage command values S49 include voltage command values Vu, Vv, and Vw for the U, V, and W phases, respectively.

The current correction controller 50 generates an ON/OFF signal S50 indicating whether or not a current correction is to be performed based on a reference speed parameter corresponding to a predetermined reference speed and the rotor speed S442 inputted from the phase velocity estimator 44, and outputs the ON/OFF signal S50 to the phase voltage correction controller 51 and the PWM signal generator 52.

Here, the reference speed parameter is a parameter to be compared with the electrical angular velocity ω of the rotor. The current correction controller 50 determines whether the rotational speed of the motor 9 is higher than the predetermined reference speed by using the electrical angular velocity ω of the rotor included in the rotor speed S442 inputted to the current correction controller 50 as a rotational speed parameter. If it is determined that the rotational speed of the motor 9 is lower than the reference speed, the current correction controller 50 generates, as the ON/OFF signal S50, an ON signal to give an instruction to perform the current correction. Meanwhile, if it is determined that the rotational speed of the motor 9 is higher than the reference speed, the current correction controller 50 generates, as the ON/OFF signal S50, an OFF signal to give an instruction not to perform the current correction. A method of determining which of the ON signal and the OFF signal is to be generated as the ON/OFF signal S50 will be described in detail below.

The phase voltage correction controller 51 adds the same correction signal to each of the voltage command values Vu, Vv, and Vw included in the first phase voltage command values S49 to calculate second phase voltage command values S51, based on the ON/OFF signal S50 and the first phase voltage command values S49. Then, the phase voltage correction controller 51 outputs the second phase voltage command values S51 to the PWM signal generator 52. That is, the second phase voltage command values S51 are corrected phase voltage command values obtained by correcting the first phase voltage command values S49.

In the case where the ON/OFF signal S50 is the ON signal, the phase voltage correction controller 51 calculates the second phase voltage command values S51 for a three-phase modulation scheme based on the first phase voltage command values S49. Meanwhile, in the case where the ON/OFF signal S50 is the OFF signal, the phase voltage correction controller 51 calculates the second phase voltage command values S51 for a two-phase modulation scheme based on the first phase voltage command values S49. Relationships between the first phase voltage command values S49 and the second phase voltage command values S51 in each of the three-phase modulation scheme and the two-phase modulation scheme will be described below.

The PWM signal generator 52 generates the switching signals S4 based on the ON/OFF signal S50, the second phase voltage command values S51, and a carrier signal S53 described below, and outputs the switching signals S4 to the inverter 2. A preferred method of generating the switching signals S4 used in the PWM signal generator 52 will be described below.

The carrier signal generator 53 generates the carrier signal S53, and outputs the carrier signal S53 to the PWM signal generator 52. The carrier signal S53 is a reference signal which is compared with each of the second phase voltage command values S51 when the switching signals S4 are generated in the PWM signal generator 52. According to the present preferred embodiment, the carrier signal S53 is preferably a triangle wave.

As described above, according to the present preferred embodiment, a rotational speed detector 61 configured or programmed to acquire the rotor speed S442 used as the rotational speed parameter representing the rotational speed of the motor 9 is preferably defined by the AD converter 3 and the phase current estimator 41, the Clarke transformer 42, the Park transformer 43, and the phase velocity estimator 44 of the microcontroller 4. In addition, a switching signal generation system determination controller 62 configured or programmed to determine a switching signal generation system is preferably defined by the current correction controller 50 of the microcontroller 4.

Furthermore, a phase voltage command value calculator 63 configured or programmed to calculate the first phase voltage command values S49 based on the target rotational speed S40 and the rotor speed S442, which is used as the rotational speed parameter, is preferably defined by the speed controller 46, the voltage command controller 47, the inverse Park transformer 48, and the inverse Clarke transformer 49 of the microcontroller 4. Furthermore, a switching signal generator 64 configured or programmed to generate the switching signals S4 based on the switching signal generation system determined by the switching signal generation system determination controller 62 is defined by the phase voltage correction controller 51 and the PWM signal generator 52 of the microcontroller 4.

Figure 3:
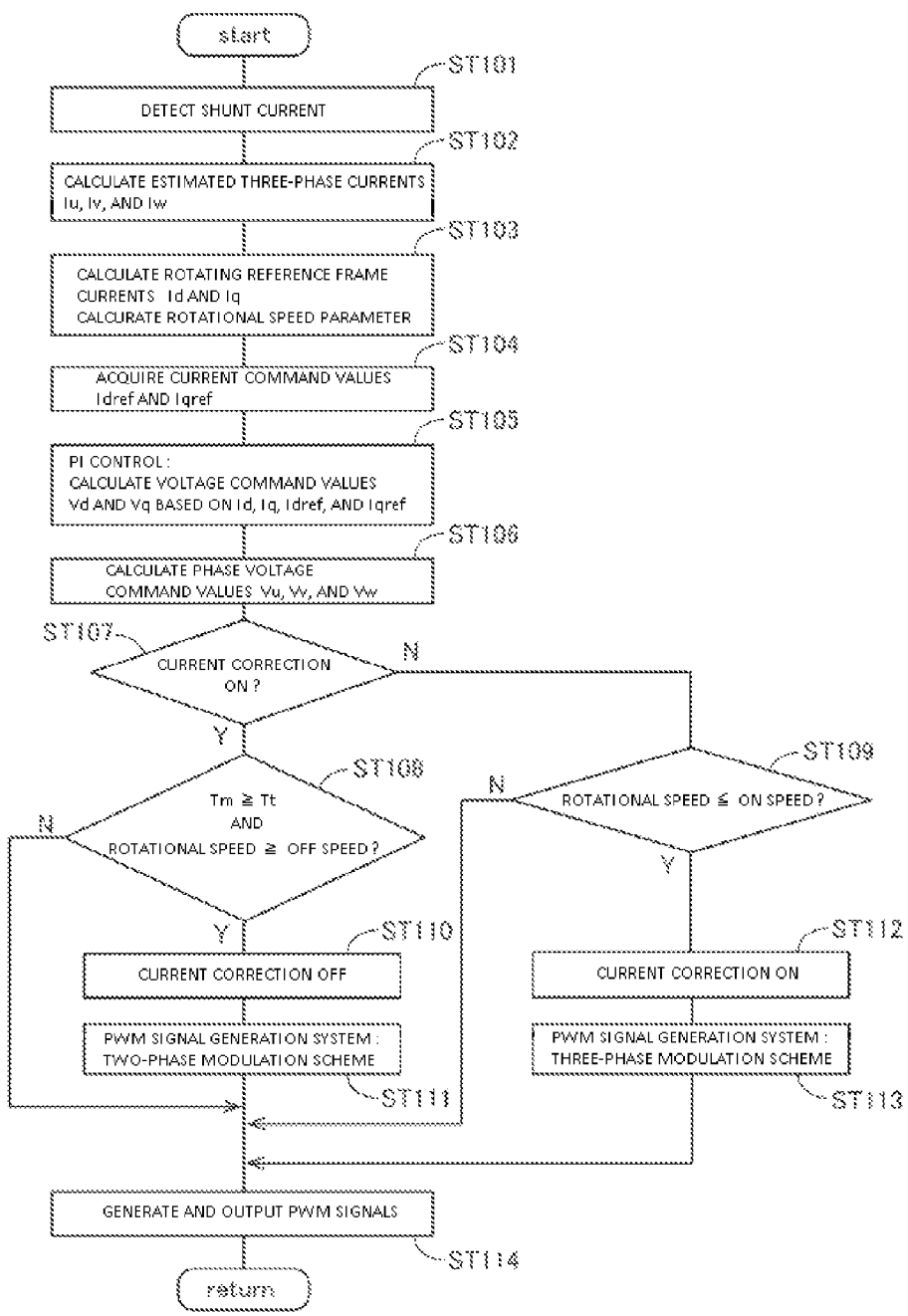
FIG. 3 is a flowchart illustrating an operation of the motor controller according to the first preferred embodiment of the present invention.

Next, an operation of the motor controller 1 will be described below with reference to FIG. 3. FIG. 3 is a flowchart illustrating the operation of the motor controller 1. A method of controlling the motor 9 which uses the motor controller 1 according to the present preferred embodiment has a procedure described below, in which the switching signals are generated by using two types of methods, i.e., the three-phase modulation scheme and the two-phase modulation scheme, and it is determined whether or not the current correction is to be performed, in accordance with the rotational speed of the motor 9.

First, the motor controller 1 detects the shunt current Is which flows through the shunt resistor Rs of the inverter 2 (step ST101). Specifically, the shunt voltage S24 detected at the shunt current detecting terminal 24 of the inverter 2 is converted to the digital shunt voltage S3 in the AD converter 3. Then, the digital shunt voltage S3 is outputted from the AD converter 3 to the phase current estimator 41 of the microcontroller 4.

Next, in the phase current estimator 41, the estimated three-phase currents S41, i.e., the estimated three-phase currents Iu, Iv, and Iw, are calculated based on the digital shunt voltage S3 (step ST102).

Then, the estimated three-phase currents Iu, Iv, and Iw are transformed to the dq synchronously rotating reference frame through the Clarke transformer 42 and the Park transformer 43 to calculate the rotating reference frame currents S43 (step ST103). Specifically, step ST103 includes a process of transforming the estimated three-phase currents Iu, Iv, and Iw to the αβ stationary reference frame to calculate the stationary reference frame currents Iα and Iβ, and a process of transforming the stationary reference frame currents Iα and Iβ to the dq synchronously rotating reference frame to calculate the rotating reference frame currents Id and Iq. Then, the rotating reference frame currents S43, which include the rotating reference frame currents Id and Iq, are outputted to the voltage command controller 47 and the phase velocity estimator 44.

In addition, at step ST103, the electrical angle θ of the rotor of the motor 9 and the electrical angular velocity ω of the rotor are calculated in the phase velocity estimator 44. Thus, the electrical angular velocity ω of the rotor, which is used as the rotational speed parameter, is calculated. Then, the rotor position S441 is outputted from the phase velocity estimator 44 to the Park transformer 43 and the inverse Park transformer 48, and the rotor speed S442 is outputted from the phase velocity estimator 44 to the rotation angle converter 45 and the current correction controller 50. The rotation angle converter 45 converts the rotor speed S442 from the electrical angular velocity ω to the mechanical angular velocity ωr, and outputs the mechanical angular velocity ωr as the rotational speed S45 to the speed controller 46.

Meanwhile, the speed controller 46 calculates the current command values S46 based on the target rotational speed S40 inputted from the external source and the rotational speed S45. Thus, the d-axis current command value Idref and the q-axis current command value Iqref are acquired (step ST104). The current command value Idref and Iqref in the dq rotating reference frame are the parameter that shows the target rotational speed S40. Note that step ST104 may be performed either before steps ST101 to ST103 or in parallel with steps ST101 to ST103.

Next, the voltage command controller 47 calculates the voltage command values Vd and Vq based on the rotating reference frame currents Id and Iq and the current command values Idref and Iqref (step ST105).

At step ST105, calculation of the voltage command values Vd and Vq is performed by the PI control. The PI control is a control method which involves a combination of proportional control (P control), in which amplification control is performed in accordance with a difference between a desired value and a measured value, and integral control (I control), in which amplification control is performed in accordance with an integral of the difference between the desired value and the measured value. Thus, the d-axis voltage command value Vd is calculated from a difference between the d-axis rotating reference frame current Id and the d-axis current command value Idref, and the q-axis voltage command value Vq is calculated from a difference between the q-axis rotating reference frame current Iq and the q-axis current command value Iqref.

Note that the calculation of the voltage command values Vd and Vq may alternatively be performed by another control method than the PI control. The calculation of the voltage command values Vd and Vq may be performed by any other desirable control method, such as, for example, P control, PD control, or PID control.

As described above, because the estimated phase currents Iu, Iv, and Iw, which are estimated phase currents flowing in the respective phases of the motor 9, are transformed to the dq synchronously rotating reference frame at step ST103, it is possible to perform control using the rotating reference frame currents Id and Iq, which can be regarded as direct currents, at step ST105. Accordingly, it is possible to exercise control over the motor 9 with a q axis representing a torque characteristic and a d axis representing a magnetic flux characteristic, and it is therefore possible to control two characteristics of the rotational speed and a torque without using a complicated control method.

Thereafter, the voltage command values Vd and Vq are subjected to reference frame transformation through the inverse Park transformer 48 and the inverse Clarke transformer 49 to calculate the first phase voltage command values Vu, Vv, and Vw (step ST106). Specifically, step ST106 includes a process of transforming the voltage command values Vd and Vq, each of which is a rotating reference frame voltage command value, to the αβ stationary reference frame to calculate the stationary reference frame voltage command values Vα and Vβ, and a process of transforming the stationary reference frame voltage command values Vα and Vβ to the three-phase reference frame to calculate the first phase voltage command values Vu, Vv, and Vw.

As described above, in steps ST104 to ST106, the first phase voltage command values Vu, Vv, and Vw are calculated based on the target rotational speed S40 and the rotor speed S442.

Here, the current correction controller 50 determines whether or not the current correction is to be performed based on the predetermined reference speed and the rotor speed S442 inputted from the phase velocity estimator 44 (steps ST107, ST108, and ST109). Note that, according to the present preferred embodiment, a determination as to whether or not the current correction is to be performed and a determination as to which of the three-phase modulation scheme and the two-phase modulation scheme is to be selected as the switching signal generation system are made simultaneously. According to the present preferred embodiment, if the current correction is ON (i.e., to be performed), the three-phase modulation scheme is selected as the switching signal generation system, while if the current correction is OFF (i.e., not to be performed), the two-phase modulation scheme is selected as the switching signal generation system.

First, it is determined whether or not the current correction is ON (step ST107). That is, it is determined whether or not the ON/OFF signal S50 is the ON signal. If it is determined that the ON/OFF signal S50 is the ON signal at present, control proceeds to step ST108. Meanwhile, if it is determined that the ON/OFF signal S50 is the OFF signal at present, control proceeds to step ST109.

At step ST108, it is determined whether or not a running time Tm of the motor 9 is equal to or longer than a predetermined threshold time Tt, and whether or not the rotational speed of the motor 9 is equal to or higher than an OFF speed. At this time, whether or not the rotational speed of the motor 9 is equal to or higher than the OFF speed is determined based on the electrical angular velocity ω of the rotor and the OFF speed.

If it is determined at step ST108 that the running time Tm is equal to or longer than the threshold time Tt, and the rotational speed of the motor 9 is equal to or higher than the OFF speed, control proceeds to step ST110. Then, the current correction is changed from ON to OFF (step ST110). In addition, the switching signal generation system is changed to the two-phase modulation scheme (step ST111).

According to the present preferred embodiment, processes of steps ST110 and ST111 are accomplished by the current correction controller 50 switching the ON/OFF signal S50 from the ON signal to the OFF signal and outputting the OFF signal to the phase voltage correction controller 51 and the PWM signal generator 52.

Meanwhile, if it is determined at step ST108 that the running time Tm is shorter than the threshold time Tt, or the rotational speed of the motor 9 is lower than the OFF speed, control proceeds to step ST114 while maintaining the ON status of the current correction and maintaining the three-phase modulation scheme as the switching signal generation system. That is, the current correction controller 50 continues to output the ON signal as the ON/OFF signal S50.

Meanwhile, it is determined at step ST109 whether or not the rotational speed of the motor 9 is equal to or lower than an ON speed. At this time, whether or not the rotational speed of the motor 9 is equal to or lower than the ON speed is determined based on the electrical angular velocity ω of the rotor and the ON speed.

If it is determined at step ST109 that the rotational speed of the motor 9 is equal to or lower than the ON speed, control proceeds to step ST112. Then, the current correction is changed from OFF to ON (step ST112). In addition, the switching signal generation system is changed to the three-phase modulation scheme (step ST113). According to the present preferred embodiment, processes of steps ST112 and ST113 are accomplished by the current correction controller 50 switching the ON/OFF signal S50 from the OFF signal to the ON signal and outputting the ON signal to the phase voltage correction controller 51 and the PWM signal generator 52.

Meanwhile, if it is determined at step ST109 that the rotational speed of the motor 9 is higher than the ON speed, control proceeds to step ST114 while maintaining the OFF status of the current correction and maintaining the two-phase modulation scheme as the switching signal generation system. That is, the current correction controller 50 continues to output the OFF signal as the ON/OFF signal S50.

As described above, according to the present preferred embodiment, the OFF speed, which is a reference speed based on which the current correction is changed from ON to OFF, and the ON speed, which is a reference speed based on which the current correction is changed from OFF to ON, are different from each other. According to the present preferred embodiment, the OFF speed is higher than the ON speed. In addition, according to the present preferred embodiment, not only the rotational speed of the rotor of the motor 9 but also the running time of the motor 9, i.e., a time from start of rotation of the motor 9 to the present time, is taken into account when determining whether or not the current correction is to be performed.

Note that only one reference speed may be used as a reference speed based on which it is determined whether or not the current correction is to be performed. In other words, the ON speed and the OFF speed may be identical to each other. However, in the case where only one reference speed is used, the current correction may be repeatedly switched back and forth between ON and OFF during a short period of time if the rotational speed of the motor 9 fluctuates around the single reference speed. That is, the motor 9 may repeatedly vibrate during a short period of time. Therefore, it is preferable that two separate reference speeds, i.e., the ON speed and the OFF speed different from each other, be used to set hysteresis as in the present preferred embodiment.

While, according to the present preferred embodiment, the ON speed and the OFF speed, which are used as the reference speeds at steps ST108 and ST109, respectively, are previously determined, this is not essential to the present invention. It may be so arranged that a reference speed is inputted from an external source to the microcontroller 4 to change the reference speed.

Then, the switching signals S4 are generated in the phase voltage correction controller 51 and the PWM signal generator 52 in accordance with the switching signal generation system set at steps ST107 to ST113, and are outputted to the inverter 2 (step ST114). Note that, in the case where the current correction is ON, a correction of the switching signals S4 is performed in the PWM signal generator 52 at step ST114. A value of each signal generated and outputted at step ST114 will be described in detail below.

As described above, according to the present preferred embodiment, the determination as to whether or not the current correction is to be performed and the determination as to which of the three-phase modulation scheme and the two-phase modulation scheme is to be selected as the switching signal generation system are made using the same reference speeds. Vibrations of the motor may occur due to disturbances of waveforms of the currents in the motor when the current correction is switched between ON and OFF, and when the switching signal generation system is switched between the three-phase modulation scheme and the two-phase modulation scheme. According to the present preferred embodiment, a switching of the current correction between ON and OFF and a switching of the switching signal generation system between the three-phase modulation scheme and the two-phase modulation scheme are performed simultaneously to reduce the frequency of occurrence of the vibrations of the motor 9.

Figure 4:
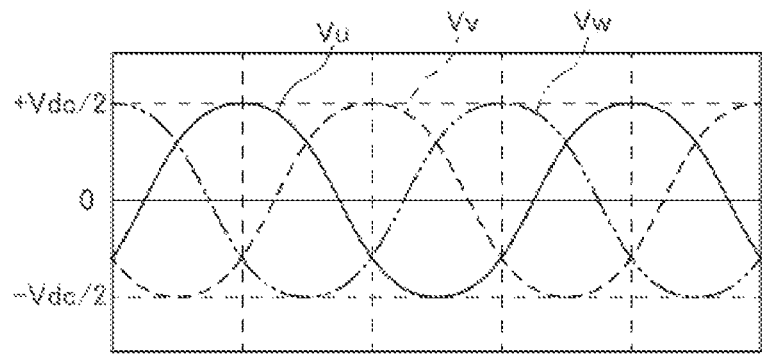
FIG. 4 shows diagrams illustrating waveforms of phase voltage command values of the motor controller according to the first preferred embodiment of the present invention.
Figure 4:
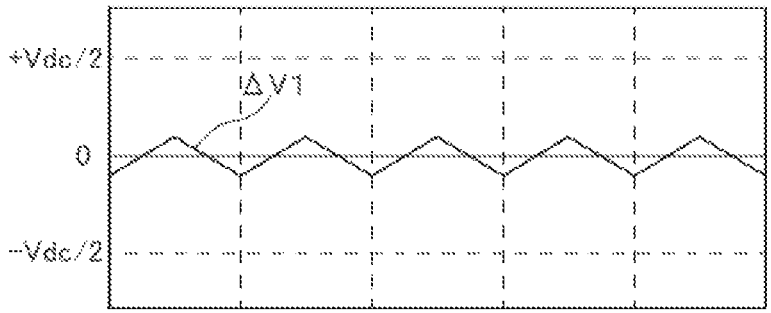
Figure 4:
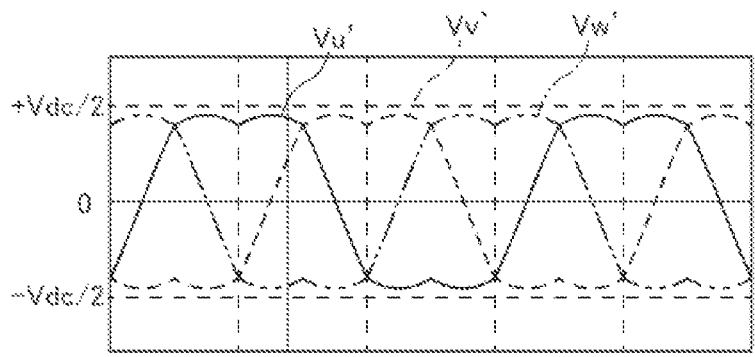
Figure 5:
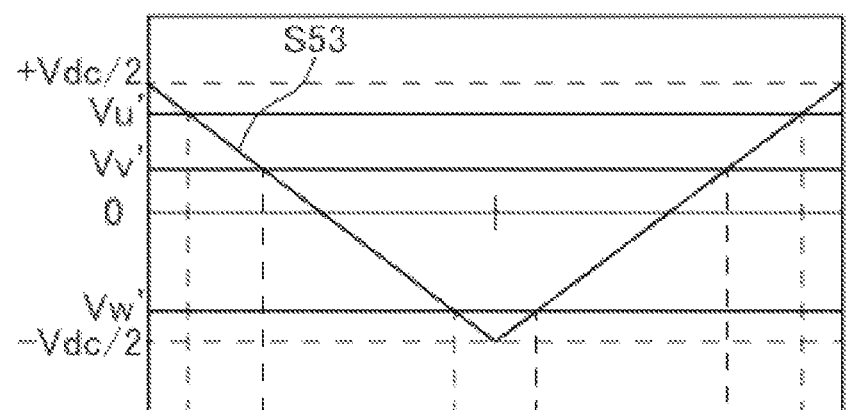
FIG. 5 shows diagrams illustrating examples of switching signals of the motor controller according to the first preferred embodiment of the present invention.
Figure 5:
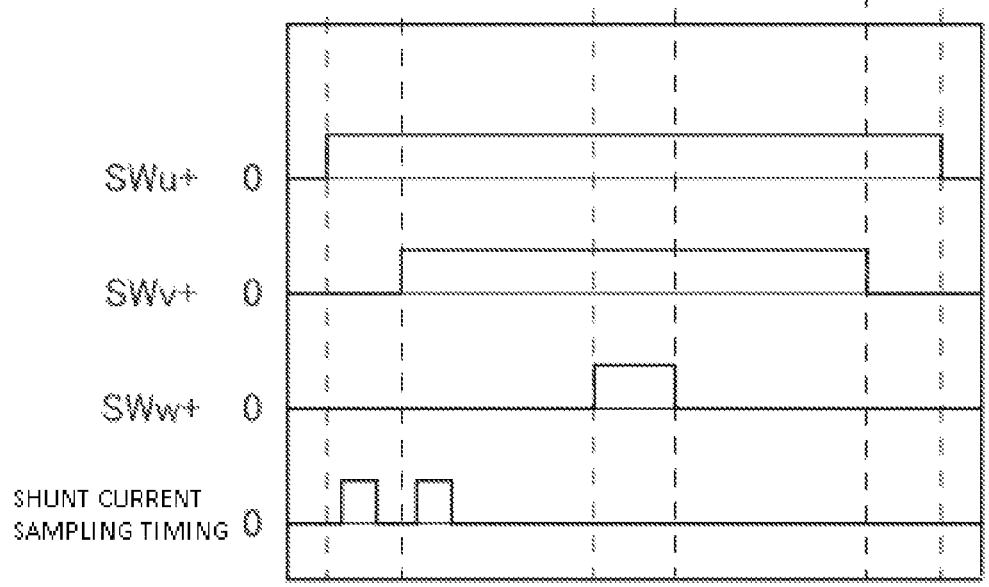
Figure 6:
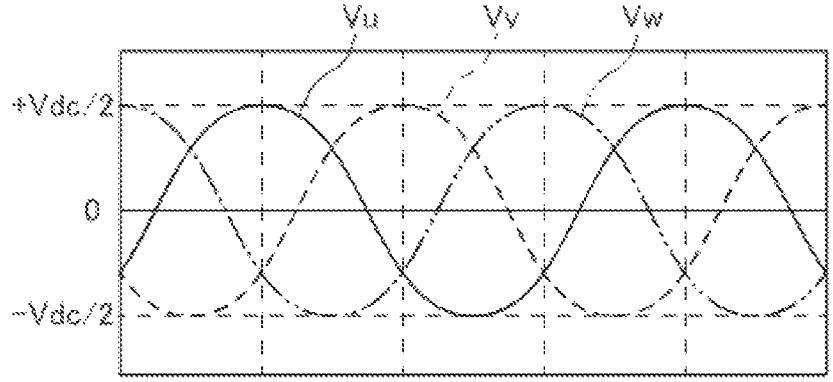
FIG. 6 shows diagrams illustrating waveforms of phase voltage command values of the motor controller according to the first preferred embodiment of the present invention.
Figure 6:
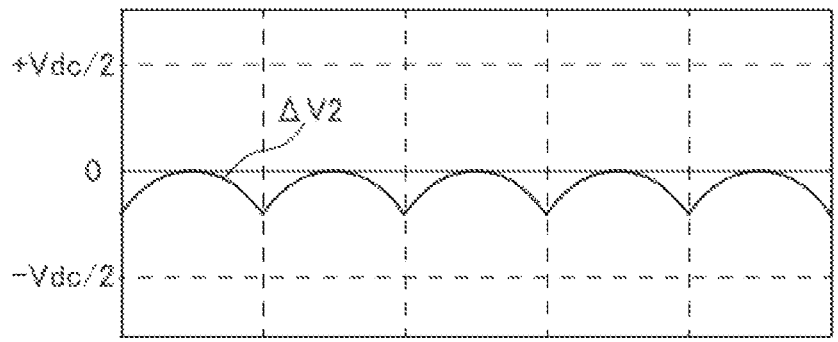
Figure 6:
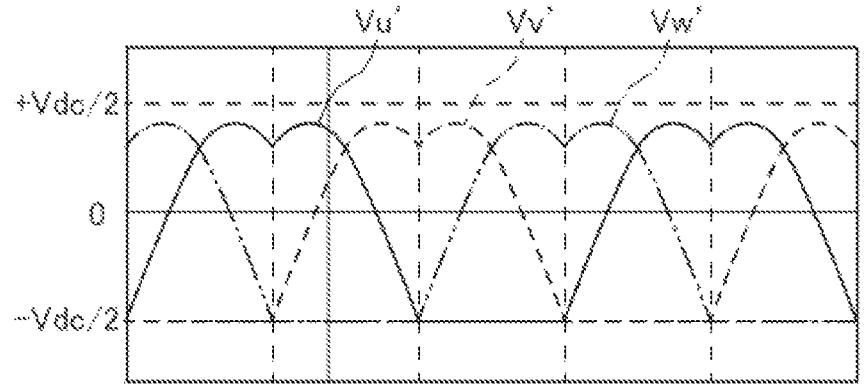
Figure 7:
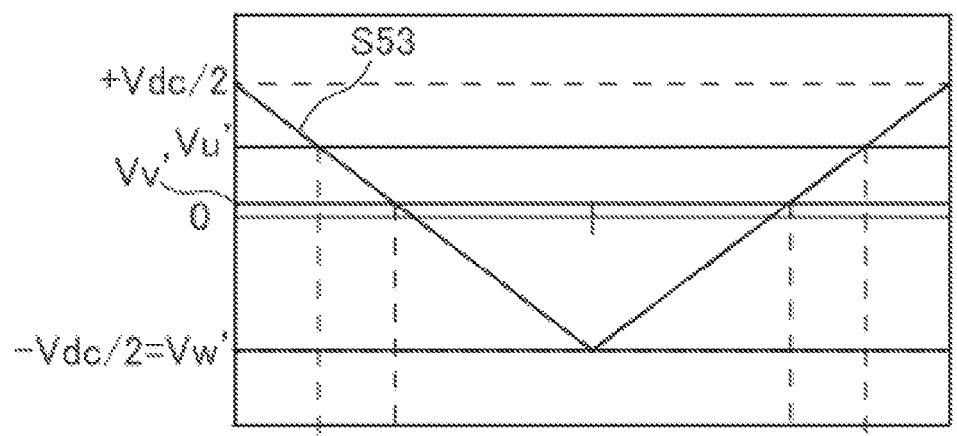
FIG. 7 shows diagrams illustrating examples of the switching signals of the motor controller according to the first preferred embodiment of the present invention.
Figure 7:
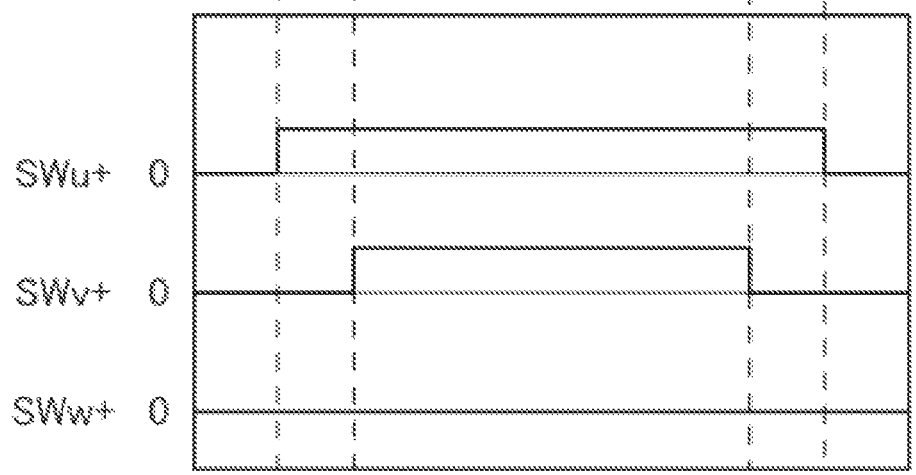

Next, the switching signal generation systems will now be described specifically below with reference to FIGS. 4, 5, 6, and 7. FIG. 4 shows diagrams illustrating waveforms of phase voltage command values in accordance with the three-phase modulation scheme used in the motor controller 1. FIG. 5 shows diagrams illustrating examples of the switching signals in accordance with the three-phase modulation scheme used in the motor controller 1. FIG. 6 shows diagrams illustrating waveforms of phase voltage command values in accordance with the two-phase modulation scheme used in the motor controller 1. FIG. 7 shows diagrams illustrating examples of the switching signals in accordance with the two-phase modulation scheme used in the motor controller 1.

In each of FIGS. 4 and 6, (a) shows the voltage command values Vu, Vv, and Vw included in the first phase voltage command values S49, (b) shows a correction signal ΔV, and (c) shows voltage command values Vu', Vv', and Vw' included in the second phase voltage command values S51. Meanwhile, in each of FIGS. 5 and 7, (a) shows the carrier signal S53 and the voltage command values Vu', Vv', and Vw' included in the second phase voltage command values S51, and (b) shows the upper switching signals SWu+, SWv+, and SWw+ included in the switching signals S4.

First, the switching signal generation system in accordance with the three-phase modulation scheme will now be described below. The three-phase modulation scheme corresponds to a first system of the switching signal generation systems as recited in the appended claims. According to the present preferred embodiment, the switching signal generation system is switched by switching the correction signal ΔV calculated in the phase voltage correction controller 51 between a correction signal ΔV1 for the three-phase modulation scheme and a correction signal ΔV2 for the two-phase modulation scheme. If the ON/OFF signal S50 inputted from the current correction controller 50 is the ON signal, the phase voltage correction controller 51 selects the correction signal ΔV1 for the three-phase modulation scheme as the correction signal ΔV. Meanwhile, if the ON/OFF signal S50 is the OFF signal, the phase voltage correction controller 51 selects the correction signal ΔV2 for the two-phase modulation scheme as the correction signal ΔV.

As shown in (a) of FIG. 4, the first phase voltage command values Vu, Vv, and Vw calculated by the inverse Clarke transformer 49 are sine waves which differ in phase by a one-third of a cycle from one another. The phase voltage correction controller 51 calculates the correction signal ΔV based on the first phase voltage command values Vu, Vv, and Vw, and adds the correction signal ΔV to each of the first phase voltage command values Vu, Vv, and Vw to generate the second phase voltage command values Vu', Vv', and Vw'.

In the three-phase modulation scheme according to the present preferred embodiment, the correction signal ΔV is given by ΔV1=−1/2*(Vmax+Vmin), where Vmax is one of the first phase voltage command values Vu, Vv, and Vw that has the greatest voltage value, and Vmin is one of the first phase voltage command values Vu, Vv, and Vw that has the smallest voltage value. Thus, the correction signal ΔV1 in accordance with the three-phase modulation scheme has a waveform resembling a triangle wave as shown in (b) of FIG. 4.

Then, as shown in (c) of FIG. 4, the second phase voltage command values Vu', Vv', and Vw', which are given by Vu'=Vu+ΔV1, Vv'=Vv+ΔV1, and Vw'=Vw+ΔV1, respectively, are generated by adding the correction signal ΔV to each of the first phase voltage command values Vu, Vv, and Vw, and are outputted to the PWM signal generator 52.

As described above, according to the present preferred embodiment, the switching signals S4 are generated based on the second phase voltage command values Vu', Vv', and Vw' obtained by adding the same correction signal ΔV1 to each of the first phase voltage command values Vu, Vv, and Vw. Line-to-line voltages between the U and V phases, between the V and W phases, and between the W and U phases in the case where the phase voltage command values inputted to the PWM signal generator 52 are the second phase voltage command values Vu', Vv', and Vw' are identical to line-to-line voltages between the U and V phases, between the V and W phases, and between the W and U phases, respectively, in the case where the phase voltage command values inputted to the PWM signal generator 52 are the first phase voltage command values Vu, Vv, and Vw. An improvement in a voltage utilization rate is achieved by thus correcting the phase voltage command values without affecting any of the line-to-line voltages applied to the motor 9.

Next, a method of generating the switching signals used in the PWM signal generator 52 will now be described below. It is assumed here that the current correction is not performed, and the current correction is not taken into account. The current correction will be described further below.

FIG. 5 shows one control cycle of the PWM signal generator 52. As shown in (a) of FIG. 5, the PWM signal generator 52 compares the voltage value of each of the second phase voltage command values Vu', Vv', and Vw' with the voltage value of the carrier signal S53 in each control cycle to calculate duties of the switching signals S4 for each of the three phases of the motor 9 based on relative magnitudes of the compared voltage values.

Referring to FIG. 5, of the switching signals S4, the upper switching signal SWu+ for the U phase of the motor 9 is in an ON state during a period in which the value of the second phase voltage command value Vu' for the U phase is greater than the value of the carrier signal S53, and is in an OFF state (i.e., a zero-voltage state) during periods in which the value of the second phase voltage command value Vu' is smaller than the value of the carrier signal S53. Similarly, the upper switching signal SWv+ for the V phase of the motor 9 is in the ON state during a period in which the value of the second phase voltage command value Vv' is greater than the value of the carrier signal S53, and is in the OFF state (i.e., the zero-voltage state) during periods in which the value of the second phase voltage command value Vv' is smaller than the value of the carrier signal S53. Similarly, the upper switching signal SWw+ for the W phase of the motor 9 is in the ON state during a period in which the value of the second phase voltage command value Vw' is greater than the value of the carrier signal S53, and is in the OFF state (i.e., the zero-voltage state) during periods in which the value of the second phase voltage command value Vw' is smaller than the value of the carrier signal S53. The PWM signal generator 52 generates the upper switching signals SWu+, SWv+, and SWw+ of the switching signals S4 in the above-described manner.

The lower switching signals SWu−, SWv−, and SWw− of the switching signals S4 are basically the reverse of the upper switching signals SWu+, SWv+, and SWw+ paired therewith, respectively. That is, while the upper switching signal SWu+ is in the ON state, the lower switching signal SWu− is in the OFF state, and while the upper switching signal SWu+ is in the OFF state, the lower switching signal SWu− is in the ON state. While the upper switching signal SWv+ is in the ON state, the lower switching signal SWv− is in the OFF state, and while the upper switching signal SWv+ is in the OFF state, the lower switching signal SWv− is in the ON state. While the upper switching signal SWw+ is in the ON state, the lower switching signal SWw− is in the OFF state, and while the upper switching signal SWw+ is in the OFF state, the lower switching signal SWw− is in the ON state.

Note that, if ON/OFF switchings of the upper switching signal SWu+ and the lower switching signal SWu−, of the upper switching signal SWv+ and the lower switching signal SWv−, and of the upper switching signal SWw+ and the lower switching signal SWw− are performed simultaneously, a flow-through current may occur to cause a DC power supply short circuit. Therefore, the lower switching signals SWu−, SWv−, and SWw− are arranged to have waveforms which are the reverse of the waveforms of the upper switching signals SWu+, SWv+, and SWw+, respectively, to which a short-circuit prevention time is added.

Next, the switching signal generation system in accordance with the two-phase modulation scheme will be described below. The two-phase modulation scheme corresponds to a second system of the switching signal generation systems as recited in the appended claims. As shown in (a) of FIG. 6, the first phase voltage command values Vu, Vv, and Vw inputted to the phase voltage correction controller 51 in the case of the two-phase modulation scheme are the same voltage signals as those in the case of the three-phase modulation scheme as shown in (a) of FIG. 4.

In the two-phase modulation scheme according to the present preferred embodiment, the correction signal ΔV is given by ΔV2=−1/2*Vdc−Vmin, where Vmin is one of the first phase voltage command values Vu, Vv, and Vw that has the smallest voltage value. Thus, the correction signal ΔV2 in accordance with the two-phase modulation scheme has a waveform as shown in (b) of FIG. 6.

Then, the second phase voltage command values Vu', Vv', and Vw', which are given by Vu'=Vu+ΔV2, Vv'=Vv+ΔV2, and Vw'=Vw+ΔV2, respectively, are generated by adding the correction signal ΔV2 to each of the first phase voltage command values Vu, Vv, and Vw, and are outputted to the PWM signal generator 52. In the two-phase modulation scheme according to the present preferred embodiment, as shown in (c) of FIG. 6, the voltage value of one of the second phase voltage command values Vu', Vv', and Vw' is selectively, one after another, fixed at −1/2*Vdc for a one-third of the cycle.

Next, the method of generating the switching signals used in the PWM signal generator 52 will be described below. As in the above description with respect to the three-phase modulation scheme, it is assumed here that the current correction is not performed, and the current correction is not taken into account.

Similar to FIG. 5, FIG. 7 shows one control cycle of the PWM signal generator 52. As shown in (a) of FIG. 7, the PWM signal generator 52 compares the voltage value of each of the second phase voltage command values Vu', Vv', and Vw' with the voltage value of the carrier signal S53 in each control cycle to calculate the duties of the switching signals S4 for each of the three phases of the motor 9 based on relative magnitudes of the compared voltage values.

FIG. 7 shows one control cycle in a period during which the voltage command value Vw' for the W phase included in the second phase voltage command values S51 is fixed at −1/2*Vdc. Of the switching signals S4, the upper switching signal SWu+ for the U phase is in the ON state during a period in which the value of the second phase voltage command value Vu' is greater than the value of the carrier signal S53, and is in the OFF state (i.e., the zero-voltage state) during periods in which the value of the second phase voltage command value Vu' is smaller than the value of the carrier signal S53. Similarly, the upper switching signal SWv+ for the V phase is in the ON state during a period in which the value of the second phase voltage command value Vv' is greater than the value of the carrier signal S53, and is in the OFF state (i.e., the zero-voltage state) during periods in which the value of the second phase voltage command value Vv' is smaller than the value of the carrier signal S53. Meanwhile, the second phase voltage command value Vw' is always equal to or smaller than the value of the carrier signal S53 and is fixed at a voltage value which never crosses the carrier signal S53 during this control cycle. Thus, of the switching signals S4, the upper switching signal SWw+ for the W phase is always in the OFF state (i.e., the zero-voltage state) during this control cycle.

Then, as described above, the lower switching signals SWu−, SWv−, and SWw− of the switching signals S4 preferably have waveforms which are the reverse of the waveforms of the upper switching signals SWu+, SWv+, and SWw+, respectively, to which the short-circuit prevention time is added. In the example of FIG. 7, since the switching signal SWw+ is always in the OFF state (i.e., the zero-voltage state) during this control cycle, the switching signal SWw− paired therewith is always in the ON state during this control cycle.

As described above, in accordance with the two-phase modulation scheme, one of the three phases is selected, and the duties of a pair of switching signals for the selected phase are fixed in the ON state or the OFF state, and the duties of the switching signals for the other two phases are calculated.

Note that, although the control cycle of the PWM signal generator 52 and a cycle of the carrier signal S53 preferably coincide with each other according to the present preferred embodiment, this is not essential to the present invention. The cycle of the carrier signal S53 may be set such that the control cycle of the PWM signal generator 52 coincides with an integral multiple of the cycle of the carrier signal S53.

While the two-phase modulation scheme is used, if the rotational speed of the motor 9 is low and close to zero, the waveform of each phase voltage is easily disturbed due to an effect of a disturbance, and an overvoltage and harmonics easily occur. Therefore, it is preferable that the motor 9 be driven using not the two-phase modulation scheme but the three-phase modulation scheme when the rotational speed of the motor 9 is low, particularly when the motor 9 is started.

Meanwhile, the two-phase modulation scheme is able to significantly reduce the number of switchings required to be performed by the inverter 2 as a whole to about two-thirds of the number of switchings performed by the inverter 2 as a whole while the three-phase modulation scheme is used. Thus, the two-phase modulation scheme is able to reduce a power loss due to the switchings, and is able to improve power efficiency of the motor controller 1.

Accordingly, according to the present preferred embodiment, as described above, the three-phase modulation scheme is used when the rotational speed of the motor 9 is lower than the reference speed, i.e. the ON speed, while the two-phase modulation scheme is used when the rotational speed of the motor 9 is higher than the reference speed, i.e., the OFF speed. Thus, the power efficiency is improved without deteriorating starting characteristics and motor drive characteristics when the rotational speed is low.

Figure 8:
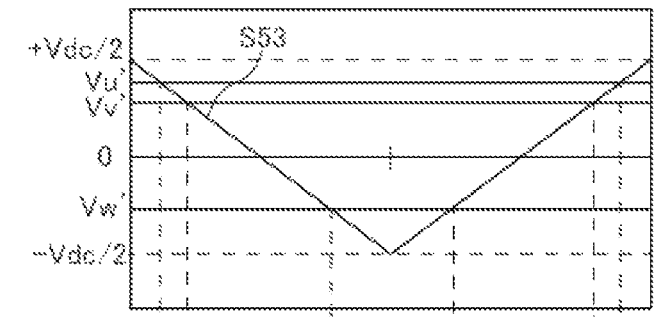
FIG. 8 shows diagrams illustrating an exemplary current correction performed by the motor controller according to the first preferred embodiment of the present invention.
Figure 8:
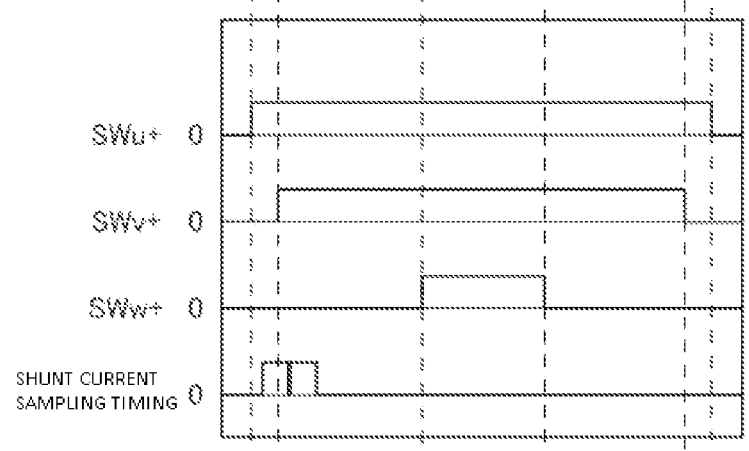
Figure 8:
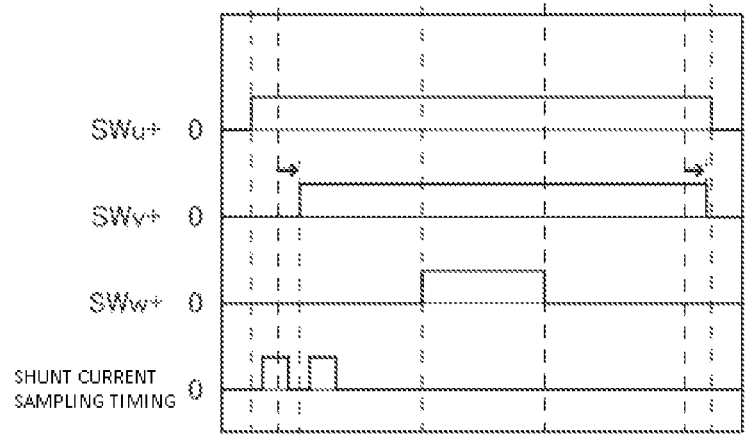

Next, the current correction will now be described below with reference to FIGS. 5 and 8. FIG. 8 shows diagrams illustrating an exemplary current correction performed by the motor controller 1 according to the present preferred embodiment. In FIG. 8, (a) shows the carrier signal S53 and the voltage command values Vu', Vv', and Vw' included in the second phase voltage command values S51, (b) shows the upper switching signals SWu+, SWv+, and SWw+ when the current correction is not performed, and (c) shows the upper switching signals SWu+, SWv+, and SWw+ after the current correction is performed.

According to the present preferred embodiment, the inverter 2 of a one-shunt type preferably is used as described above. The inverter 2 of the one-shunt type is inexpensive and compact compared to an inverter of a three-shunt type, in which a separate shunt resistor is used for each of the three phases, and an inverter using two current sensors.

In the inverter 2 of the one-shunt type, the phase currents of the three phases which flow through the motor 9 are inputted to the single shunt resistor Rs. Thus, because the phase currents which flow through the motor 9 are estimated using only one shunt resistor Rs, the shunt current Is is measured at two points in time during one control cycle to estimate the phase currents of the three phases.

During one control cycle, the shunt current Is is measured at a point in time during a period in which the upper switching element T and the lower switching element T for one of the three phases are in the ON state and in the OFF state, respectively, and the upper switching element T and the lower switching element T for each of the other two phases are in the OFF state and in the ON state, respectively, and at a point in time during a period in which the upper switching element T and the lower switching element T for each of two of the three phases are in the ON state and in the OFF state, respectively, and the upper switching element T and the lower switching element T for the remaining phase are in the OFF state and in the ON state, respectively.

The points in time at which the shunt current Is is measured are shown at a lowermost portion of (b) of FIG. 5. In the example of FIG. 5, Vu'>Vv'>Vw', and therefore, the upper switching signal SWu+ has the longest ON period, followed by the upper switching signal SWv+, followed by the upper switching signal SWw+, which has the shortest ON period. Accordingly, a first measurement of the shunt current Is is performed in a period during which the upper switching signal SWu+ and the lower switching signal SWu− are in the ON state and in the OFF state, respectively, and the upper switching signals SWv+ and SWw+ and the lower switching signals SWv− and SWw− are in the OFF state and in the ON state, respectively. In addition, a second measurement of the shunt current Is is performed in a period during which the upper switching signals SWu+ and SWv+ and the lower switching signals SWu− and SWv− are in the ON state and in the OFF state, respectively, and the upper switching signal SWw+ and the lower switching signal SWw− are in the OFF state and in the ON state, respectively.

In the case where Vu'>Vv'>Vw' as in the example of FIG. 5, the estimated U-phase current Iu, the estimated V-phase current Iv, and the estimated W-phase current Iw included in the estimated three-phase currents S41 are given by Iu=Is1, Iv=Is2−Is1, and Iw=Is2, respectively, where Is1 is the value of the shunt current measured at the first measurement, and Is2 is the value of the shunt current measured at the second measurement.

When any of the upper switching elements Tu+, Tv+, and Tw+ is switched from the OFF state to the ON state, a corresponding one of the lower switching elements Tu−, Tv−, and Tw− is switched from the ON state to the OFF state after the short-circuit prevention time elapses after the upper switching element Tu+, Tv+, or Tw+ is switched to the ON state. Therefore, as shown in (b) of FIG. 5, the first measurement of the shunt current Is needs to be performed for a period of time sufficient for sampling after the short-circuit prevention time elapses after the upper switching signal SWu+ enters the ON state. Similarly, the second measurement of the shunt current Is needs to be performed for a period of time sufficient for sampling after the short-circuit prevention time elapses after the upper switching signal SWv+ enters the ON state.

In a control cycle in which the values of the voltage command values Vu' and Vv' included in the second phase voltage command values S51 are close to each other as in the control cycle shown in FIG. 8, a period from a time when the upper switching signal SWu+ enters the ON state to a time when the upper switching signal SWv+ enters the ON state is short. Consequently, as shown in (b) of FIG. 8, the upper switching signal SWv+ enters the ON state before an end of a period during which the first measurement of the shunt current Is is performed, resulting in a failure to accurately measure the shunt current Is.

Thus, the current correction is performed to enable accurate measurement of the shunt current Is. As shown in (c) of FIG. 8, the period during which the upper switching signal SWv+ is in the ON state is shifted a little forward as indicated by solid line arrows to prevent the period during which the first measurement of the shunt current Is is performed from overlapping with a period during which the upper switching signal SWv+ is in the ON state. Note that, at this time, just as the period during which the upper switching signal SWv+ is in the ON state is shifted a little forward, a period during which the lower switching signal SWv− is in the OFF state is shifted a little forward. Accurate measurement of the shunt current Is is thus made possible by performing the current correction, which is adjustment of ON/OFF switching timing of one or two pairs of switching signals among the three pairs of switching signals included in the switching signals S4.

As described above, in the case where the inverter 2 of the one-shunt type is used, the shunt current Is is measured at two separate points in time with different outputs in one control cycle, and therefore, restrictions are imposed on timing of the measurement of the shunt current Is. When the rotational speed of the motor 9 is low, a period during which the shunt current Is cannot be measured accurately is long, and therefore, a need to perform the current correction arises. Accordingly, according to the present preferred embodiment, the current correction is performed when the rotational speed of the motor 9 is lower than the reference speed as described above. Thus, accurate calculation of the estimated three-phase currents S41 is possible even when the rotational speed of the motor 9 is low.

2. Example Modifications

While a preferred embodiment of the present invention has been described above, it will be understood that the present invention is not limited to the above-described preferred embodiment.

Figure 9:
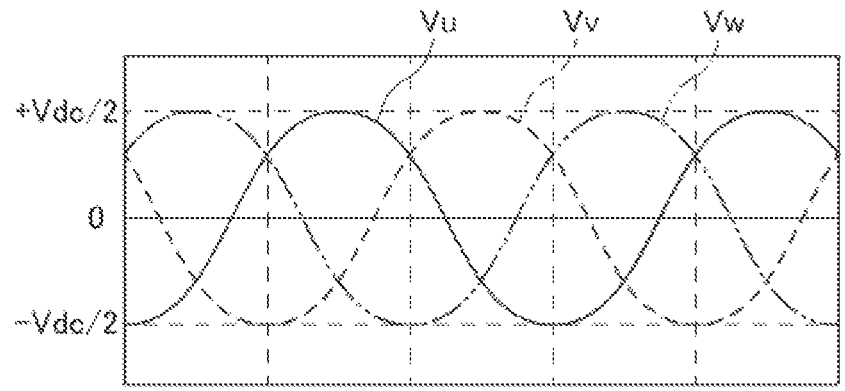
FIG. 9 shows diagrams illustrating waveforms of phase voltage command values of a motor controller according to a modification of the first preferred embodiment of the present invention.
Figure 9:
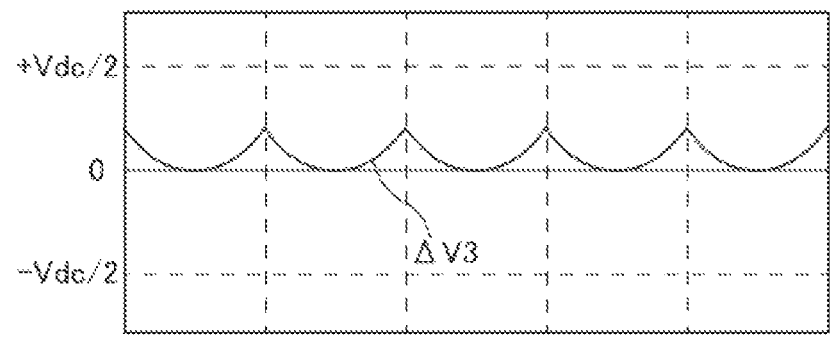
Figure 9:
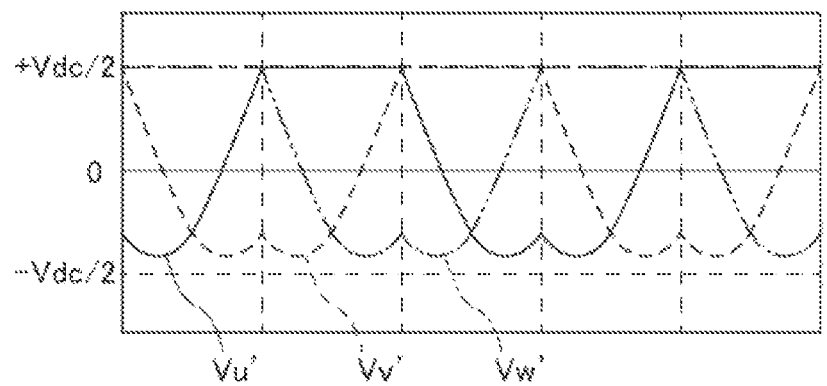
Figure 10:
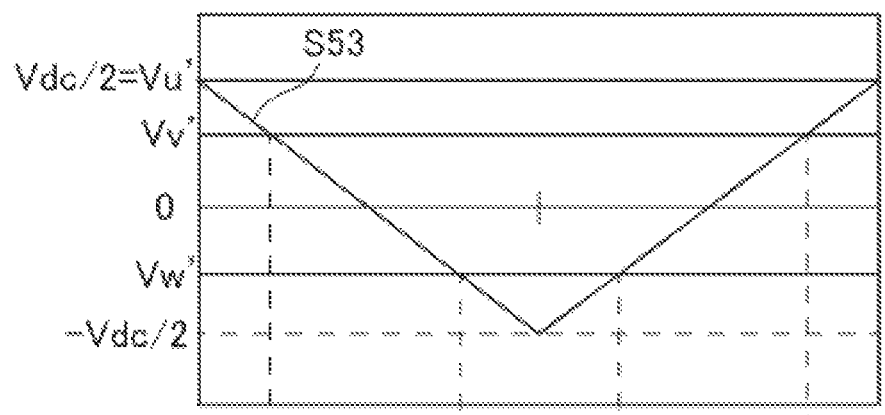
FIG. 10 shows diagrams illustrating examples of switching signals of the motor controller according to a modification of the first preferred embodiment of the present invention.
Figure 10:
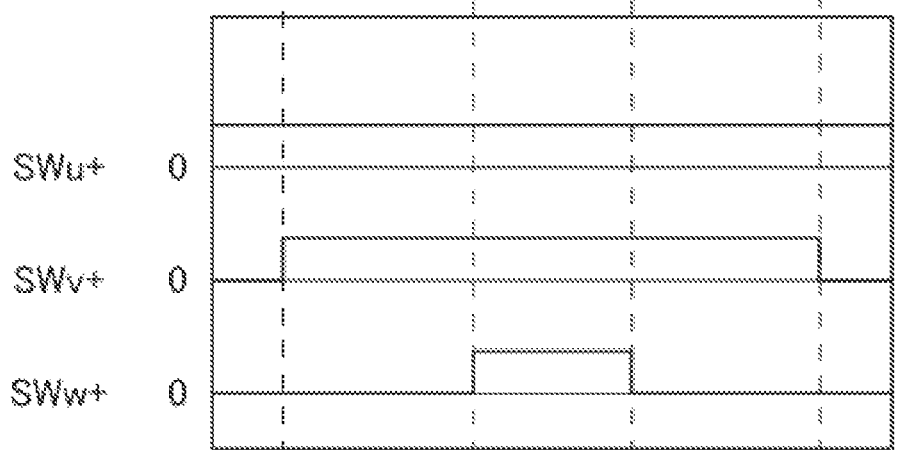

FIG. 9 shows diagrams illustrating exemplary waveforms of phase voltage command values in accordance with a two-phase modulation scheme used in a motor controller according to a modification of the above-described preferred embodiment. FIG. 10 shows diagrams illustrating examples of switching signals in accordance with the two-phase modulation scheme used in the motor controller according to the modification of FIG. 9.

In FIG. 9, (a) shows voltage command values Vu, Vv, and Vw included in first phase voltage command values S49, (b) shows a correction signal ΔV, and (c) shows voltage command values Vu', Vv', and Vw' included in second phase voltage command values S51. Meanwhile, in FIG. 10, (a) shows a carrier signal S53 and the voltage command values Vu', Vv', and Vw' included in the second phase voltage command values S51, and (b) shows upper switching signals SWu+, SWv+, and SWw+ included in switching signals S4.

In the two-phase modulation scheme according to the above-described preferred embodiment, the voltage value of one of the second phase voltage command values Vu', Vv', and Vw' is selectively, one after another, fixed at −1/2*Vdc for a one-third of a cycle. As a result, of the switching signals S4, the upper switching signal for one of the three phases, the phase corresponding to one of the second phase voltage command values Vu', Vv', and Vw' whose voltage value is fixed at −1/2*Vdc, is always in the OFF state (i.e., the zero-voltage state) during one control cycle, and the lower switching signal for the one of the three phases is always in the ON state during the one control cycle. Note, however, that this is not essential to the present invention.

Alternatively, in the two-phase modulation scheme, the voltage value of one of the second phase voltage command values Vu', Vv', and Vw' may be selectively, one after another, fixed at +1/2*Vdc for a one-third of the cycle. In this case, of the switching signals S4, the upper switching signal for one of the three phases, the phase corresponding to one of the second phase voltage command values Vu', Vv', and Vw' whose voltage value is fixed at +1/2*Vdc, is always in the ON state during one control cycle, and the lower switching signal for the one of the three phases is always in the OFF state (i.e., the zero-voltage state) during the one control cycle.

In the two-phase modulation scheme according to the modification of FIG. 9, the correction signal ΔV is given by ΔV3=1/2*Vdc−Vmax, where Vmax is one of the voltage command values Vu, Vv, and Vw that has the greatest voltage value. Thus, the correction signal ΔV3 in accordance with the two-phase modulation scheme has a waveform as shown in (b) of FIG. 9.

Then, the second phase voltage command values Vu', Vv' and Vw', which are given by Vu'=Vu+ΔV3, Vv'=Vv+ΔV3, and Vw'=Vw+ΔV3, respectively, are generated by adding the correction signal ΔV3 to each of the first phase voltage command values Vu, Vv, and Vw. In the two-phase modulation scheme according to the modification of FIG. 9, as shown in (c) of FIG. 9, the voltage value of one of the second phase voltage command values Vu', Vv', and Vw' is selectively, one after another, fixed at +1/2*Vdc for a one-third of the cycle.

Next, a method of generating the switching signals according to the modification of FIG. 9 will now be described below with reference to FIG. 10. It is assumed here that the current correction is not performed, and the current correction is not taken into account.

FIG. 10 shows one control cycle of a PWM signal generator 52. As shown in (a) of FIG. 10, the PWM signal generator 52 compares the voltage value of each of the second phase voltage command values Vu', Vv', and Vw' with the voltage value of the carrier signal S53 in each control cycle to calculate duties of the switching signals S4 for each of the three phases of a motor 9 based on relative magnitudes of the compared voltage values.

FIG. 10 shows one control cycle in a period during which the voltage command value Vu' for the U phase included in the second phase voltage command values S51 is fixed at +1/2*Vdc. Of the switching signals S4, the upper switching signal SWv+ for the V phase is in the ON state during a period in which the value of the second phase voltage command value Vv' is greater than the value of the carrier signal S53, and is in the OFF state (i.e., the zero-voltage state) during periods in which the value of the second phase voltage command value Vv' is smaller than the value of the carrier signal S53. Similarly, the upper switching signal SWw+ for the W phase is in the ON state during a period in which the value of the second phase voltage command value Vw' is greater than the value of the carrier signal S53, and is in the OFF state (i.e., the zero-voltage state) during periods in which the value of the second phase voltage command value Vw' is smaller than the value of the carrier signal S53. Meanwhile, the second phase voltage command value Vu' is always equal to or greater than the value of the carrier signal S53 and is fixed at a voltage value which never crosses the carrier signal S53 during this control cycle. Thus, of the switching signals S4, the upper switching signal SWu+ for the U phase is always in the ON state during this control cycle.

Then, as described above, the lower switching signals SWu−, SWv−, and SWw− of the switching signals S4 preferably have waveforms which are the reverse of the waveforms of the upper switching signals SWu+, SWv+, and SWw+, respectively, to which the short-circuit prevention time is added. In the example of FIG. 10, since the switching signal SWu+ is always in the ON state during this control cycle, the switching signal SWu− paired therewith is always in the OFF state (i.e., the zero-voltage state) during this control cycle.

As described above, duties of a pair of switching signals for one of the three phases included in the switching signals S4 may be such that the duty of the upper switching signal is fixed in the ON state, and the duty of the lower switching signal is fixed in the OFF state.

Figure 11:
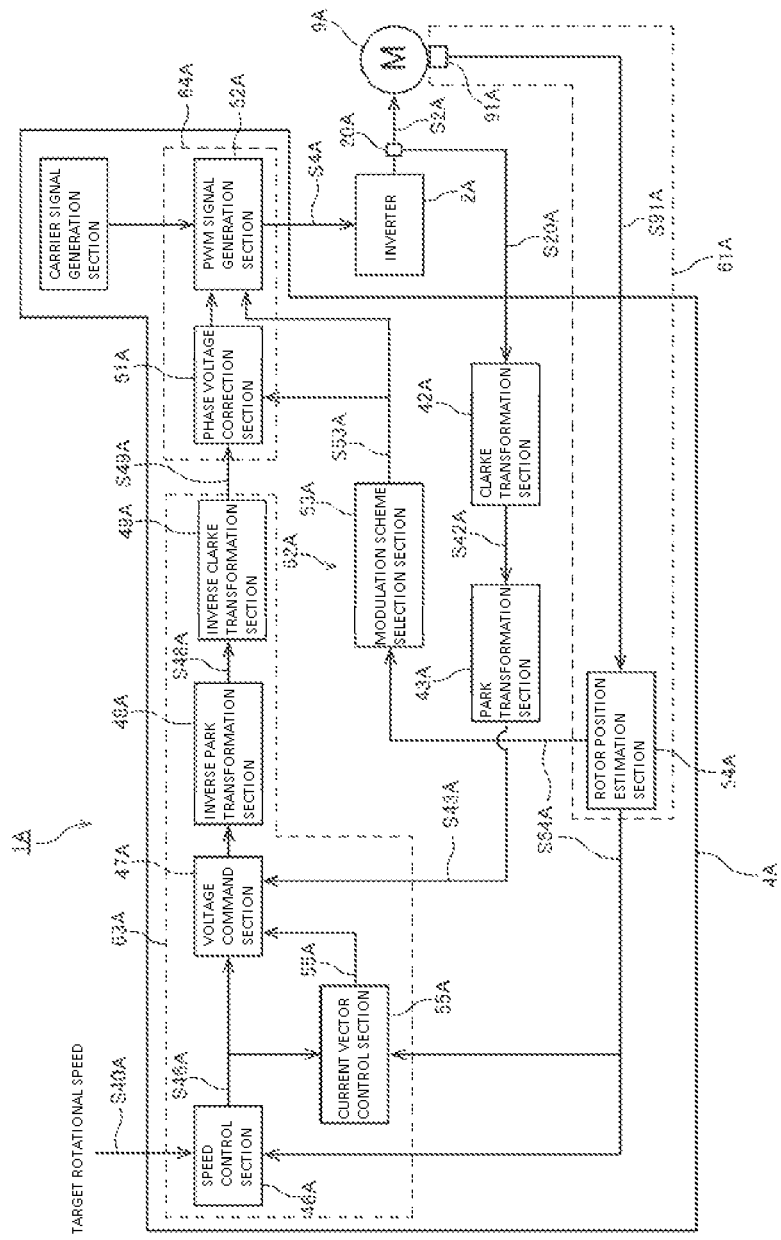
FIG. 11 is a block diagram illustrating the structure of a motor controller according to a modification of the first preferred embodiment of the present invention.
Figure 12:
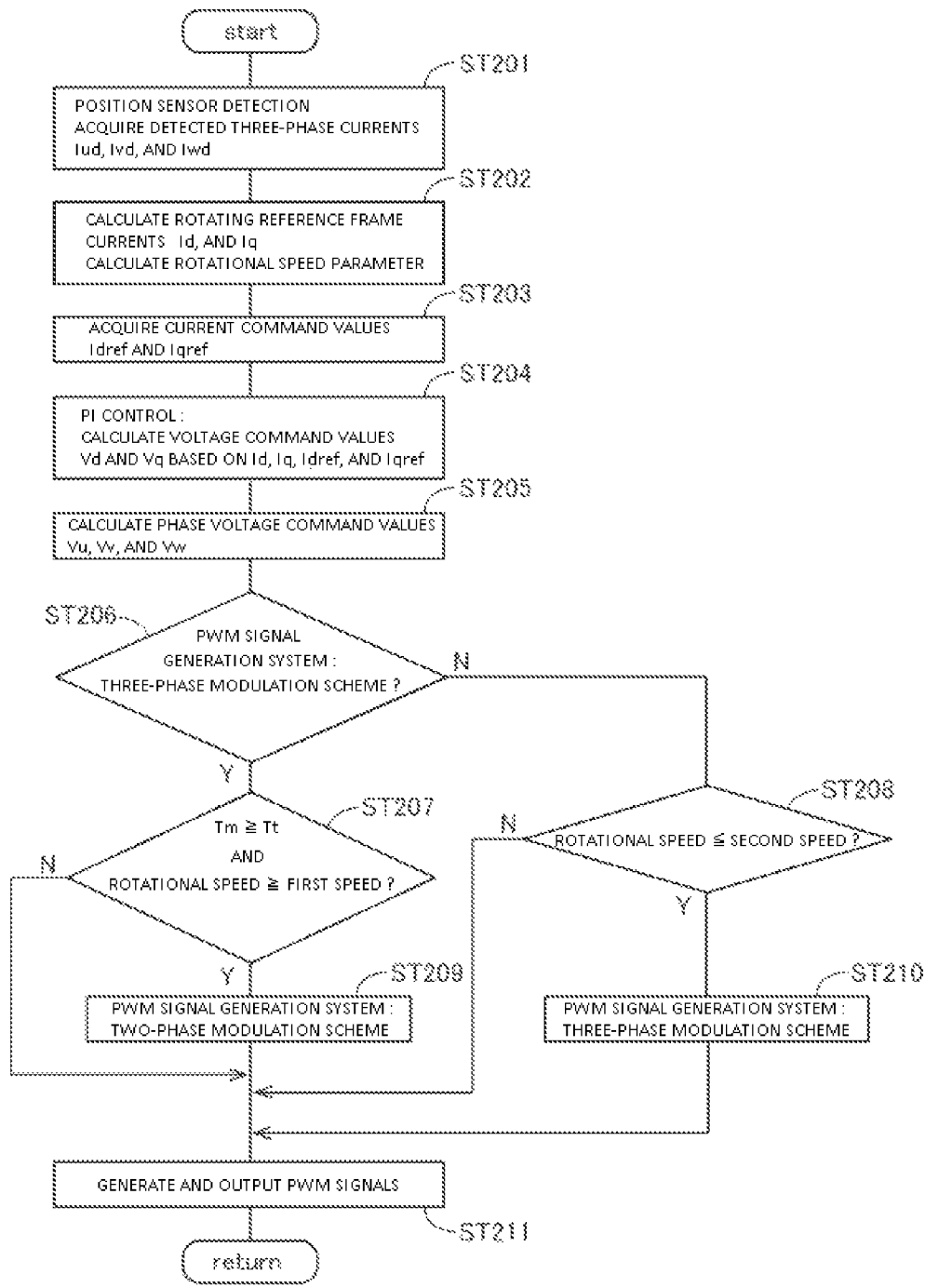
FIG. 12 is a flowchart illustrating an operation of the motor controller according to a modification of the first preferred embodiment of the present invention.

FIG. 11 is a block diagram illustrating the structure of a motor controller 1A according to another modification of the above-described preferred embodiment. FIG. 12 is a flowchart illustrating an operation of the motor controller 1A according to the modification of FIG. 11. The motor controller 1A is a drive apparatus configured or programmed to drive a motor 9A preferably including a position sensor 91A configured or programmed to detect a rotor position. The operation of the motor controller 1A will now be described below with reference to FIGS. 11 and 12.

First, the position sensor 91A of the motor 9A performs a detection (step ST201). The position sensor 91A of the motor 9A is preferably defined by, for example, a plurality of Hall sensors. The position sensor 91A detects waveforms of induced voltages which accompany rotation of a rotor at a plurality of positions in the motor 9A. Note that an encoder, a resolver, or the like may alternatively be used as the position sensor 91A.

In addition, at step ST201, a current sensor 20A located between an inverter 2A and the motor 9A detects electric drive currents S2A supplied from the inverter 2A to the motor 9A to acquire detected electric currents S20A. Then, the current sensor 20A outputs the acquired detected electric currents S20A to a Clarke transformer 42A. The detected electric currents S20A include detected three-phase currents Iud, Ivd, and Iwd.

Next, the detected three-phase currents Iud, Ivd, and Iwd are transformed to the dq synchronously rotating reference frame through the Clarke transformer 42A and a Park transformer 43A to calculate rotating reference frame currents S43A (step ST202). Specifically, step ST203 includes a process of transforming the detected three-phase currents Iud, Ivd, and Iwd to the αβ stationary reference frame to calculate stationary reference frame currents Iα and Iβ, and a process of transforming the stationary reference frame currents Iα and Iβ to the dq synchronously rotating reference frame to calculate rotating reference frame currents Id and Iq. Then, the rotating reference frame currents S43A, which include the rotating reference frame currents Id and Iq, are outputted to a voltage command controller 47A.

Meanwhile, at step ST202, the position sensor 91A outputs induced voltage information S91A to a rotor position estimator 54A of a microcontroller 4A, and the rotor position estimator 54A calculates a mechanical angular velocity ωr of the rotor and an electrical angle θ of the rotor based on the induced voltage information S91A. At this time, the phase of the rotor is indicated by the electrical angle θ of the rotor. In addition, in the modification illustrated in FIGS. 11 and 12, the mechanical angular velocity ωr of the rotor is used as a rotational speed parameter. Then, the rotor position estimator 54A outputs rotor information S54A including the mechanical angular velocity ωr of the rotor to a speed controller 46A, a modulation scheme selection section 53A, and a current vector controller 55A.

Then, the speed controller 46A calculates a q-axis current command value Iqref based on a target rotational speed S40A inputted from an external source and the mechanical angular velocity ωr of the rotor included in the rotor information S54A. Then, the speed controller 46A outputs a first current command value S46A including the q-axis current command value Iqref to the voltage command controller 47A and the current vector controller 55A.

The current vector controller 55A calculates a d-axis current command value Idref based on the q-axis current command value Iqref included in the first current command value S46A and the electrical angle θ and the mechanical angular velocity ωr of the rotor included in the rotor information S54A. Then, the current vector controller 55A outputs a second current command value S55A including the d-axis current command value Idref to the voltage command controller 47A (step ST203).

Next, the voltage command controller 47A calculates voltage command values Vd and Vq in the dq synchronously rotating reference frame based on the rotating reference frame currents Id and Iq and the current command values Idref and Iqref (step ST204). Calculation of the voltage command values Vd and Vq is performed, for example, by PI control.

Thereafter, the voltage command values Vd and Vq are subjected to reference frame transformation through an inverse Park transformer 48A and an inverse Clarke transformer 49A to calculate first phase voltage command values Vu, Vv, and Vw (step ST205). Specifically, step ST205 includes a process of transforming the voltage command values Vd and Vq, each of which is a rotating reference frame voltage command value, to the αβ stationary reference frame to calculate stationary reference frame voltage command values Vα and Vβ, and a process of transforming the stationary reference frame voltage command values Vα and Vβ to the three-phase reference frame to calculate the first phase voltage command values Vu, Vv, and Vw. Then, the inverse Clarke transformer 49A outputs first phase voltage command values S49A including the first phase voltage command values Vu, Vv, and Vw to a phase voltage correction controller 51A.

As described above, at steps ST203 to ST205, the first phase voltage command values Vu, Vv, and Vw are calculated based on the target rotational speed S40A and the mechanical angular velocity ωr of the rotor included in the rotor information S54A.

Here, the modulation scheme selection section 53A determines a switching signal generation system based on a predetermined reference speed and the rotor information S54A inputted from the rotor position estimator 54A (steps ST206, ST207, and ST208). In the case where the three-phase modulation scheme is selected as the switching signal generation system, the modulation scheme selection section 53A outputs an ON signal as an ON/OFF signal S53A. Meanwhile, in the case where the two-phase modulation scheme is selected as the switching signal generation system, the modulation scheme selection section 53A outputs an OFF signal as the ON/OFF signal S53A.

First, it is determined whether or not the switching signal generation system currently used is the three-phase modulation scheme (step ST206). That is, it is determined whether or not the ON/OFF signal S53A is the ON signal. If the current ON/OFF signal S53A is the ON signal, control proceeds to step ST207. Meanwhile, if the current ON/OFF signal S53A is the OFF signal, control proceeds to step ST208.

At step ST207, it is determined whether or not a running time Tm of the motor 9A is equal to or longer than a predetermined threshold time Tt, and whether or not the rotational speed of the motor 9A is equal to or higher than a first speed. At this time, whether or not the rotational speed of the motor 9A is equal to or higher than the first speed is determined based on the mechanical angular velocity ωr of the rotor included in the rotor information S54A and the first speed.

If it is determined at step ST207 that the running time Tm is equal to or longer than the threshold time Tt, and the rotational speed of the motor 9A is equal to or higher than the first speed, control proceeds to step ST209. Then, the switching signal generation system is changed to the two-phase modulation scheme (step ST209). In the modification illustrated in FIGS. 11 and 12, a process of step ST209 is accomplished by the modulation scheme selection section 53A switching the ON/OFF signal S53A from the ON signal to the OFF signal, and outputting the OFF signal to the phase voltage correction controller 51A and a PWM signal generator 52A.

Meanwhile, if it is determined at step ST207 that the running time Tm is shorter than the threshold time Tt or the rotational speed of the motor 9A is lower than the first speed, control proceeds to step ST211 while maintaining the three-phase modulation scheme as the switching signal generation system. That is, the modulation scheme selection section 53A continues to output the ON signal as the ON/OFF signal S53A.

Meanwhile, at step ST208, it is determined whether or not the rotational speed of the motor 9A is equal to or lower than a second speed. At this time, whether or not the rotational speed of the motor 9A is equal to or lower than the second speed is determined based on the mechanical angular velocity ωr of the rotor included in the rotor information S54A and the second speed.

If it is determined at step ST208 that the rotational speed of the motor 9A is equal to or lower than the second speed, control proceeds to step ST210. Then, the switching signal generation system is changed to the three-phase modulation scheme (step ST210). In the modification illustrated in FIGS. 11 and 12, a process of step ST210 is accomplished by the modulation scheme selection section 53A switching the ON/OFF signal S53A from the OFF signal to the ON signal, and outputting the ON signal to the phase voltage correction controller 51A and the PWM signal generator 52A.

Meanwhile, if it is determined at step ST208 that the rotational speed of the motor 9A is higher than the second speed, control proceeds to step ST211 while maintaining the two-phase modulation scheme as the switching signal generation system. That is, the modulation scheme selection section 53A continues to output the OFF signal as the ON/OFF signal S53A.

As described above, in the modification illustrated in FIGS. 11 and 12, the first speed, which is a reference speed based on which the switching signal generation system is switched from the three-phase modulation scheme to the two-phase modulation scheme, and the second speed, which is a reference speed based on which the switching signal generation system is switched from the two-phase modulation scheme to the three-phase modulation scheme, are different from each other. Note that, in the modification illustrated in FIGS. 11 and 12, the first speed is higher than the second speed. In addition, in the modification illustrated in FIGS. 11 and 12, not only the rotational speed of the rotor of the motor 9A but also the running time of the motor 9A, i.e., a time from start of rotation of the motor 9A to the present time, is taken into account when determining whether the switching signal generation system is to be the three-phase modulation scheme or the two-phase modulation scheme.

Then, in the phase voltage correction controller 51A and the PWM signal generator 52A, switching signals S4A are generated in accordance with the switching signal generation system set as a result of steps ST206 to ST210, and are outputted to the inverter 2A (step ST211).

As described above, in the modification illustrated in FIGS. 11 and 12, a rotational speed detector 61A configured or programmed to acquire the mechanical angular velocity ωr of the rotor, which is used as the rotational speed parameter representing the rotational speed of the motor 9A, is preferably defined by the position sensor 91A and the rotor position estimator 54A of the microcontroller 4A, while a switching signal generation system determination controller 62A configured or programmed to determine the switching signal generation system is preferably defined by the modulation scheme selection section 53A of the microcontroller 4A.

In addition, a phase voltage command value calculator 63A configured or programmed to calculate the first phase voltage command values S49A based on the target rotational speed S40A and the mechanical angular velocity ωr of the rotor used as the rotational speed parameter is defined by the speed controller 46A, the voltage command controller 47A, the inverse Park transformer 48A, the inverse Clarke transformer 49A, and the current vector controller 55A of the microcontroller 4A. Moreover, a switching signal generator 64A configured or programmed to generate the switching signals S4A based on the switching signal generation system determined by the switching signal generation system determination controller 62A is preferably defined by the phase voltage correction controller 51A and the PWM signal generator 52A of the microcontroller 4A.

Preferred embodiments of the present invention may be applied to a motor including a position sensor, as in the modification illustrated in FIGS. 11 and 12. In this case, detection of a shunt current is not needed, and therefore, it is not necessary to perform the current correction. Also note that preferred embodiments of the present invention may be applied to a sensorless motor of a so-called three-shunt type, which is provided with shunt resistors provided for each of the three phases in an inverter. In the case of the sensorless motor of the three-shunt type, the shunt current needs to be detected only once in one control cycle, at a point in time when the upper switching elements for all the three phases are in the OFF state, and therefore, the current correction is not necessary.

Other Modifications

While the determination as to whether or not the current correction is to be performed and the determination as to which of the three-phase modulation scheme and the two-phase modulation scheme is to be selected as the switching signal generation system are made preferably using the same reference speeds according to the above-described preferred embodiment, this is not essential to the present invention. The determination as to whether or not the current correction is to be performed may be made using a threshold speed different from the reference speed based on which one of the three-phase modulation scheme and the two-phase modulation scheme is selected as the switching signal generation system. In this case, the rotational speed of the motor and the threshold speed are compared with each other based on the rotational speed parameter, and it is determined whether or not the current correction is to be performed based on a result of the comparison.

According to the above-described preferred embodiments, the carrier signal with which each of the second phase voltage command values preferably is compared in the PWM signal generator is the triangle wave. Note, however, that the carrier signal may alternatively be a sawtooth wave.

While the two-phase modulation scheme according to the above-described preferred embodiments preferably is a two-phase modulation scheme of a 120-degree fixing type in which one of the three pairs of switching signals is selected every one-third of the cycle, and the duties of the selected pair of switching signals are fixed in the ON state or the OFF state during each one-third of the cycle, this is not essential to the present invention. A two-phase modulation scheme according to another preferred embodiment of the present invention may be a two-phase modulation scheme of a 60-degree fixing type in which one of the three pairs of switching signals is selected every one-sixth of the cycle, and the duties of the selected pair of switching signals are fixed in the ON state or the OFF state during each one-sixth of the cycle, for example.

While the PWM signal generator preferably is included in the microcontroller according to above-described preferred embodiment, this is not essential to the present invention. The PWM signal generator may alternatively be defined by an electrical circuit separate from the microcontroller.

While the inverter according to the above-described preferred embodiments preferably is an inverter of a so-called low-side sensing type in which the shunt resistor is arranged on a side of the switching elements closer to the ground, this is not essential to the present invention. An inverter according to another preferred embodiment of the present invention may be an inverter of a so-called high-side sensing type in which the shunt resistor(s) are arranged on a side of the switching elements closer to a power supply.

Note that the specific configuration of circuitry to implement each portion of the motor controller may differ from the configuration of circuitry illustrated in FIG. 2. Also note that features of the above-described preferred embodiments and the modifications thereof may be combined appropriately as long as no conflict arises.

Preferred embodiments of the present invention are applicable to motor control methods and motor controllers.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A method of controlling a motor driven by a three-phase voltage source inverter, the method comprising the steps of:

a) acquiring a rotational speed parameter representing a rotational speed of the motor;

b) after step a), selecting one of a first system and a second system as a switching signal generation system based on a result of comparing the rotational speed of the motor represented by the rotational speed parameter with a predetermined reference speed;

c) after step a), calculating phase voltage command values for each of three phases of the motor based on a target rotational speed and the rotational speed parameter;

d) after steps b) and c), generating switching signals for each of the three phases of the motor by using the selected switching signal generation system based on the phase voltage command values; and e) after step d), outputting the switching signals to the inverter; wherein the first system is a three-phase modulation scheme which calculates duties of the switching signals for each of the three phases of the motor based on voltage values of the phase voltage command values for each of the three phases of the motor and a voltage value of a carrier signal;

the second system is a two-phase modulation scheme which, based on the voltage values of the phase voltage command values for each of the three phases and the voltage value of the carrier signal, selects one of the three phases and fixes the duties of the switching signals for the selected phase in an ON state or an OFF state, and calculates the duties of the switching signals for the other two phases; and in step b), the second system is selected when the rotational speed is higher than the reference speed.

2. The method of controlling the motor according to claim 1, wherein step a) includes:
   a-1) detecting a shunt current which flows through a shunt resistor provided in the inverter;
   a-2) calculating estimated three-phase currents based on the shunt current;
   a-3) transforming the estimated three-phase currents to an αβ stationary reference frame to calculate stationary reference frame currents; and
   a-4) transforming the stationary reference frame currents to a dq synchronously rotating reference frame to calculate rotating reference frame currents as the rotational speed parameter.

3. The method of controlling the motor according to claim 2, wherein step c) includes:
   c-1) calculating rotating reference frame voltage command values in the dq synchronously rotating reference frame based on a current command value in the dq synchronously rotating reference frame and the rotating reference frame currents, the target rotational speed parameter representing the target rotational speed;
   c-2) transforming the rotating reference frame voltage command values to the αβ stationary reference frame to calculate stationary reference frame voltage command values; and
   c-3) transforming the stationary reference frame voltage command values to a three-phase reference frame to calculate the phase voltage command values.

4. The method of controlling the motor according to claim 2, wherein the shunt resistor is a resistor connected in series with a ground line common to all the three phases of the inverter.

5. The method of controlling the motor according to claim 4, further comprising a step of f) after step a) and before step d), comparing the rotational speed of the motor with a predetermined threshold speed based on the rotational speed parameter, and determining whether or not a current correction is to be performed in step d) based on a result of the comparison.

6. The method of controlling the motor according to claim 5, wherein
   the reference speed used in step b) and the threshold speed used in step f) are identical to each other;
   step f) is performed before step b); and
   in step b), one of the first system and the second system is selected as the switching signal generation system based on a determination as to whether or not the current correction is to be performed made at step f).

7. The method of controlling the motor according to claim 1, wherein
   the carrier signal is a triangle wave;
   step d) includes:
   d-1) adding a same correction signal to each of the phase voltage command values for the three phases to calculate corrected phase voltage command values for the three phases; and
   d-2) comparing a voltage value of each of the corrected phase voltage command values for the three phases with the voltage value of the carrier signal, and calculating the duties of the switching signals for each of the three phases based on relative magnitudes of the compared voltage values; and
   in the second system, the corrected phase voltage command value for one of the three phases selected in each cycle of the carrier signal is fixed at a voltage value which never crosses the carrier signal during the cycle.

8. The method of controlling the motor according to claim 2, wherein
   the carrier signal is a triangle wave;
   step d) includes:
   d-1) adding a same correction signal to each of the phase voltage command values for the three phases to calculate corrected phase voltage command values for the three phases; and
   d-2) comparing a voltage value of each of the corrected phase voltage command values for the three phases with the voltage value of the carrier signal, and calculating the duties of the switching signals for each of the three phases based on relative magnitudes of the compared voltage values; and
   in the second system, the corrected phase voltage command value for one of the three phases selected in each cycle of the carrier signal is fixed at a voltage value which never crosses the carrier signal during the cycle.

9. The method of controlling the motor according to claim 3, wherein
   the carrier signal is a triangle wave;
   step d) includes:
   d-1) adding a same correction signal to each of the phase voltage command values for the three phases to calculate corrected phase voltage command values for the three phases; and
   d-2) comparing a voltage value of each of the corrected phase voltage command values for the three phases with the voltage value of the carrier signal, and calculating the duties of the switching signals for each of the three phases based on relative magnitudes of the compared voltage values; and
   in the second system, the corrected phase voltage command value for one of the three phases selected in each cycle of the carrier signal is fixed at a voltage value which never crosses the carrier signal during the cycle.

10. The method of controlling the motor according to claim 4, wherein
    the carrier signal is a triangle wave;
    step d) includes:
    d-1) adding a same correction signal to each of the phase voltage command values for the three phases to calculate corrected phase voltage command values for the three phases; and
    d-2) comparing a voltage value of each of the corrected phase voltage command values for the three phases with the voltage value of the carrier signal, and calculating the duties of the switching signals for each of the three phases based on relative magnitudes of the compared voltage values; and in the second system, the corrected phase voltage command value for one of the three phases selected in each cycle of the carrier signal is fixed at a voltage value which never crosses the carrier signal during the cycle.

11. A motor controller configured or programmed to supply electric drive currents to a motor, the motor controller comprising:
- a rotational speed detector configured or programmed to acquire a rotational speed parameter representing a rotational speed of the motor;
- a switching signal generation system determination controller configured or programmed to determine a switching signal generation system;
- a phase voltage command value calculator configured or programmed to calculate phase voltage command values for each of three phases of the motor based on a target rotational speed and the rotational speed parameter;
- a switching signal generator configured or programmed to generate switching signals for each of the three phases of the motor in accordance with the switching signal generation system; and
- an inverter configured to output the electric drive currents to the motor based on the switching signals; wherein the switching signal generation system determination controller is configured or programmed to select one of a first system and a second system as the switching signal generation system based on a result of comparing the rotational speed of the motor represented by the rotational speed parameter with a predetermined reference speed;

the first system is a three-phase modulation scheme which calculates duties of the switching signals for each of the three phases of the motor based on voltage values of the phase voltage command values for each of the three phases of the motor and a voltage value of a carrier signal;

the second system is a two-phase modulation scheme which, based on the voltage values of the phase voltage command values for each of the three phases and the voltage value of the carrier signal, selects one of the three phases and fixes the duties of the switching signals for the selected phase in an ON state or an OFF state, and calculates the duties of the switching signals for the other two phases; and the switching signal generation system determination controller is configured or programmed to select the second system when the rotational speed is higher than the reference speed.

* * * * *